(12) United States Patent
Masuda et al.

(10) Patent No.: US 10,897,194 B2
(45) Date of Patent: Jan. 19, 2021

(54) POWER FACTOR IMPROVEMENT CIRCUIT AND SEMICONDUCTOR APPARATUS

(71) Applicant: FUJI ELECTRIC CO., LTD., Kawasaki (JP)

(72) Inventors: Nobuyuki Masuda, Matsumoto (JP); Takato Sugawara, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 16/807,099

(22) Filed: Mar. 2, 2020

(65) Prior Publication Data

US 2020/0204065 A1 Jun. 25, 2020

Related U.S. Application Data

(63) Continuation of application No. PCT/JP2019/001878, filed on Jan. 22, 2019.

(30) Foreign Application Priority Data

Mar. 30, 2018 (JP) ................................ 2018-068910

(51) Int. Cl.
*H02M 1/42* (2007.01)
*H02M 3/156* (2006.01)
*H02M 1/00* (2006.01)

(52) U.S. Cl.
CPC .. *H02M 1/4225* (2013.01); *H02M 2001/0035* (2013.01); *H02M 2001/0054* (2013.01)

(58) Field of Classification Search
CPC . H02M 2001/0032; H02M 2001/0035; H02M 1/32; H02M 1/42; H02M 1/4208; H02M 1/4225; H02M 3/156
See application file for complete search history.

(56) References Cited

U.S. PATENT DOCUMENTS

| | | | | |
|---|---|---|---|---|
| 6,724,174 B1 * | 4/2004 | Esteves | ................. | H02M 3/155 323/224 |
| 7,030,596 B1 * | 4/2006 | Salerno | ................. | H02M 3/158 323/282 |

(Continued)

FOREIGN PATENT DOCUMENTS

| | | |
|---|---|---|
| JP | H08294282 A | 11/1996 |
| JP | 2002136125 A | 5/2002 |

(Continued)

*Primary Examiner* — Gary L Laxton
(74) *Attorney, Agent, or Firm* — Rabin & Berdo, P.C.

(57) ABSTRACT

A power factor improvement circuit that performs, on the basis of an output voltage when a switching power-supply apparatus is in a light-load state or a no-load state, a burst operation for switching between states of the switching operation of a switching element includes: a first circuit that outputs a first voltage that corresponds to the error between a reference voltage and a voltage obtained by dividing the output voltage; and a clamp circuit that, while the burst operation is performed, clamps the lower limit of the first voltage, which decreases when the switching operation of the switching element is disabled, at a lower-limit voltage higher than the ground voltage of the power factor improvement circuit and clamps the upper limit of the first voltage, which increases when the switching operation of the switching element is performed, at an upper-limit voltage.

8 Claims, 9 Drawing Sheets

(56) References Cited

U.S. PATENT DOCUMENTS

| | | | | |
|---|---|---|---|---|
| 8,559,203 B2* | 10/2013 | Uemura | ............... | H02M 1/4225 |
| | | | | 363/89 |
| 10,784,784 B2* | 9/2020 | Chung | ............... | H02M 3/33507 |
| 2008/0030178 A1* | 2/2008 | Leonard | ................ | H02M 3/156 |
| | | | | 323/282 |
| 2016/0380530 A1 | 9/2016 | Gallagher | | |

FOREIGN PATENT DOCUMENTS

| | | |
|---|---|---|
| JP | 2006174630 A | 6/2006 |
| JP | 2014113011 A | 6/2014 |
| JP | 2016063607 A | 4/2016 |
| JP | 2016116284 A | 6/2016 |
| JP | 2017017767 A | 1/2017 |

* cited by examiner

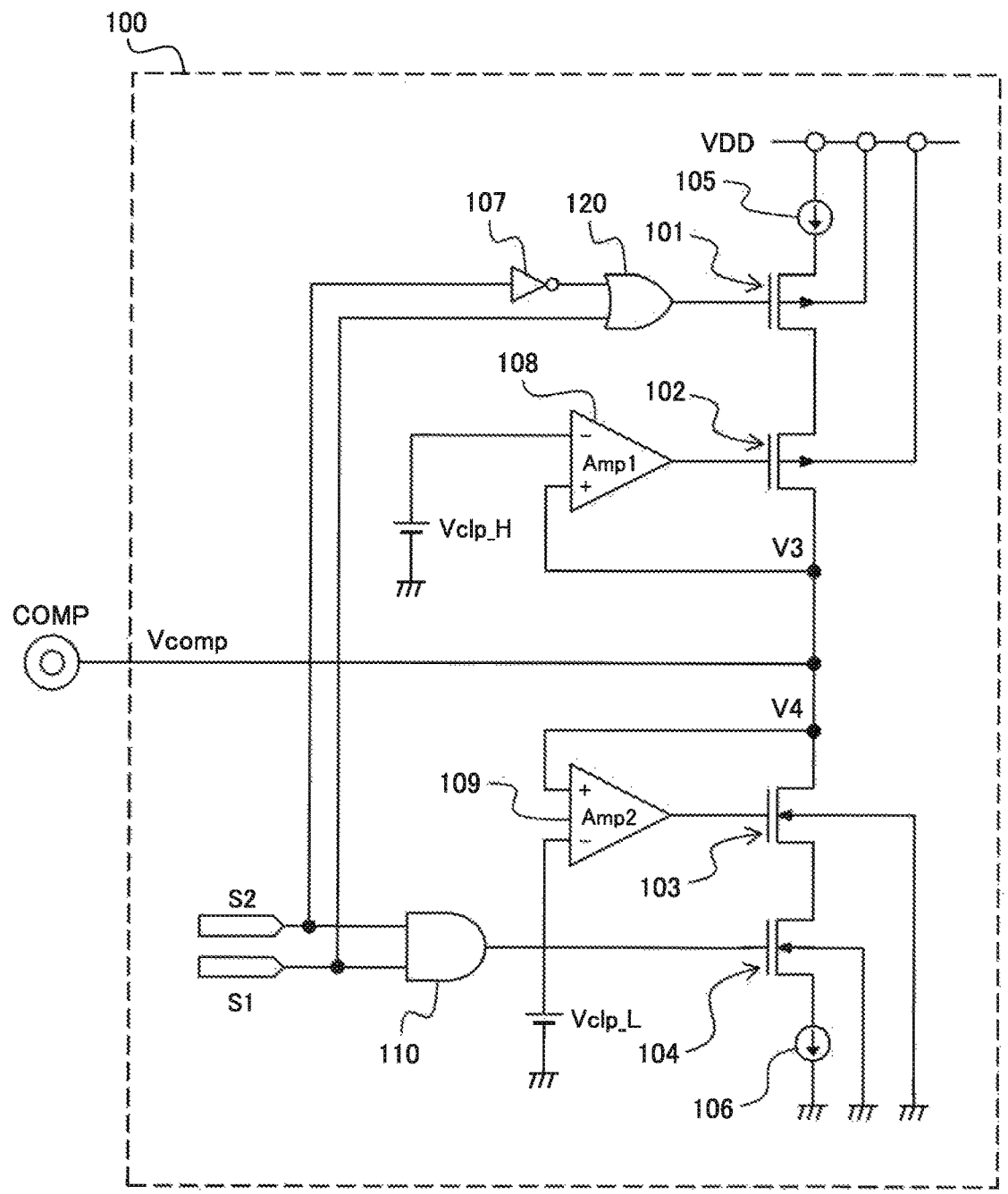
F I G. 4

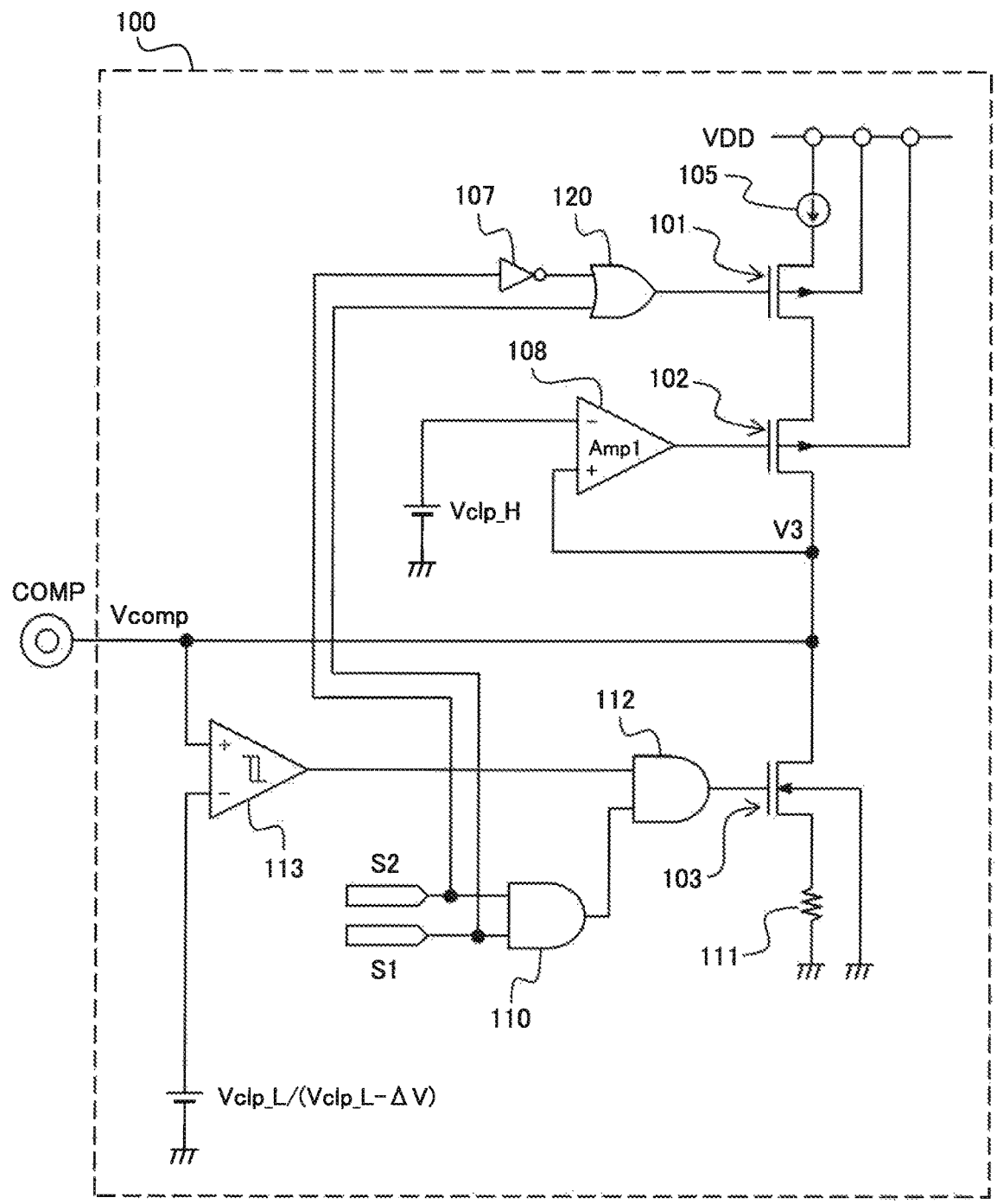
F I G. 7

POWER FACTOR IMPROVEMENT CIRCUIT AND SEMICONDUCTOR APPARATUS

CROSS-REFERENCE TO RELATED APPLICATION

The present application is a continuation application of International Application No. PCT/JP2019/001878, filed Jan. 22, 2019, which claims priority to Japanese Patent Application No. 2018-068910, filed Mar. 30, 2018. The contents of these applications are incorporated herein by reference in their entirety.

FIELD

The present invention relates to a power factor improvement circuit and a semiconductor apparatus.

BACKGROUND

Some electronic devices supplied with commercial AC power include switching power-supply apparatuses for acquiring DC power for driving electronic circuits within these electronic devices. Some of the switching power-supply apparatuses include power factor improvement circuits for improving power factors. A power factor is a value defined with reference to the efficiency of AC power and is also the proportion of effective power to apparent power.

A power factor improvement circuit improves a power factor by making an input AC voltage (e.g., 100V to 240V) consistent with the phase of an input AC current and can reduce reactive power and a harmonic current. Hence, a switching power-supply apparatus that includes the power factor improvement circuit can avoid generation of harmonic noise that could be caused by a decrease in the power factor and malfunction of, or damage to, an electronic device that could be caused by the noise.

A power factor improvement circuit is provided with a voltage boosting converter and performs control such that an input current has an AC waveform having the same phase as an input voltage while performing control such that an output voltage is a DC voltage. Control schemes for power factor improvement circuits are roughly divided into a current continuous control scheme and a current critical control scheme. The current critical control scheme among these involves self-frequency-variation pulse-width-modulation (PWM) control wherein a timing at which the current through an inductor becomes zero is detected to turn on a switch.

A switching power-supply apparatus that includes a power factor improvement circuit is such that the power factor improvement circuit is disposed in a stage next to an input stage where a bridge diode full-wave rectifies an AC voltage input from an AC power supply. A DC-DC converter based on flyback, LLC current resonance, or the like is disposed in a stage subsequent to the power factor improvement circuit.

The power factor improvement circuit performs control for keeping a constant DC voltage to be output and control for making an input AC current correspond to an input AC voltage. These control operations are performed by a control integrated circuit (control IC) included in the power factor improvement circuit.

However, a switching power-supply apparatus that includes a power factor improvement circuit based on the current critical control scheme has a switching frequency that increases as the load on the switching power-supply apparatus decreases. An increase in the switching frequency leads to an increase in switching loss that could be caused by switching elements in the power factor improvement circuit, resulting in a reduced exchange efficiency, temperature rise of power conversion elements, or the like. A power factor improvement circuit based on the current continuous control scheme is operated at a fixed frequency and thus outputs exceptionally narrow pulses when the load is low. Accordingly, when pulses are oversupplied, the output and control of a switching power-supply apparatus that includes a power factor improvement circuit based on the current continuous control scheme could become unstable because the pulses are not randomly output even if such pulses have the narrowest control width.

In addition, when the switching power-supply apparatus is required to consume low power at the time of light load, the operation of the control IC of the power factor improvement circuit is stopped to achieve decreased power consumption. In this case, input to the control IC of the power factor improvement circuit is interrupted by a mechanical relay. However, interrupting input to the control IC by means of a mechanical relay would vary the output voltage of the power factor improvement circuit, making it difficult to design a DC-DC converter or the like in the subsequent stage.

A technique for allowing the efficiency of power conversion at the time of light load to be improved or for allowing the converter or the like in the subsequent stage to be easily designed involves causing the switching element to perform a burst operation while monitoring and maintaining the output voltage of the power factor improvement circuit. Patent Document 1 (identified further on) discloses a power factor improvement circuit that improves the efficiency of power conversion by decreasing switching loss by causing a switching element to perform a burst operation when a light load or no loads are applied to a switching power-supply apparatus. Patent Document 2 (identified further on) discloses a power-supply apparatus wherein when causing a switching element to perform a burst operation, the power factor at the time of light load is improved by stopping a switching regulator being driven during a period from a moment at which an output voltage reaches a first threshold voltage to a moment at which the output voltage reaches a second threshold voltage lower than the first threshold voltage.

Patent Document 1: Japanese Laid-open Patent Publication No. 2017-17767

Patent Document 2: Japanese Laid-open Patent Publication No. 2006-174630

SUMMARY

At the time of light load, the power-supply apparatus described in Patent Document 2 stops a switching operation until the output voltage decreases to the second threshold voltage and starts (resumes) the switching operation when the output voltage has reached the second threshold voltage. However, in switching the switching operation, the output voltage could overshoot when the switching operation is resumed. This is because while the output voltage is decreased due to the stopping of the switching operation, the output of an error amplifier which determines an ON time for the switching element rises to an upper limit, the switching element is operated with the maximum ON width when the switching operation is resumed, and too much power could be sent to the output side.

To prevent this phenomenon from occurring, a metal-oxide-semiconductor field-effect transistor (MOSFET) 25 may be provided as indicated in the reference example of a switching power-supply apparatus depicted in FIG. 1 that includes a power factor improvement circuit (this example will be described hereinafter), and when stopping the switching operation at the time of light load, the MOSFET 25 may be turned on to release charge from a phase compensation circuit 11 which determines the output voltage of the error amplifier, thereby decreasing the output voltage of the error amplifier.

However, as the error amplifier absolutely needs to be provided with a phase compensation circuit, the response of output to a variation in input will be delayed. Thus, providing the MOSFET 25 so as to decrease the output voltage of the error amplifier will cause the output voltage to undershoot when the switching operation is resumed. The output voltage will overshoot when the switching operation is stopped at a timing at which the output voltage reaches the first threshold voltage after the switching operation is resumed.

When the output voltage undershoots or overshoots in switching the switching operation as described above, the output voltage could be out of the input voltage range of the converter in the subsequent stage. While the output voltage is out of the input voltage range of the converter in the subsequent range due to the undershoot or overshoot, the converter cannot send an output voltage effectively to a load by performing a switching operation. Accordingly, major undershoot or overshoot of the output voltage increases switching loss of the converter in the subsequent stage and thus reduces the efficiency of power conversion.

In one aspect, an object of the present invention is to decrease switching loss of a switching power-supply apparatus that includes a power factor improvement circuit by reducing undershoot or overshoot when a burst operation is performed by the power factor improvement circuit.

A power factor improvement circuit in accordance with one mode of the invention is a power factor improvement circuit that performs, on the basis of an output voltage when a switching power-supply apparatus is in a light-load state or a no-load state, a burst operation for switching between a stopped state in which the switching operation of a switching element is disabled and an operating state in which the switching operation of the switching element is enabled, the power factor improvement circuit including: a first circuit that outputs a first voltage that corresponds to the error between a reference voltage and a voltage obtained by dividing the output voltage; a second circuit that outputs a second voltage that starts to rise from a predetermined initial value in synchrony with the switching element being turned on; a third circuit that turns off the switching element when the second voltage has reached the first voltage; and a clamp circuit that, while the burst operation is performed, clamps the lower limit of the first voltage, which decreases when the switching operation of the switching element in the stopped state is disabled, at a lower-limit voltage higher than the ground voltage of the power factor improvement circuit and clamps the upper limit of the first voltage, which increases when the switching operation of the switching element in the operating state is performed, at an upper-limit voltage.

A semiconductor apparatus in accordance with one mode of the invention is a semiconductor apparatus that controls, on the basis of an output voltage when a switching power-supply apparatus is in a light-load state or a no-load state, a burst operation for switching between a stopped state in which the switching operation of a switching element is disabled and an operating state in which the switching operation of the switching element is enabled, the semiconductor apparatus including: a first circuit that outputs a first voltage that corresponds to the error between a reference voltage and a voltage obtained by dividing the output voltage; a second circuit that outputs a second voltage that starts to rise from a predetermined initial value in synchrony with the switching element being turned on; a third circuit that outputs a signal for turning off the switching element when the second voltage has reached the first voltage; and a clamp circuit that, while the burst operation is performed, clamps the lower limit of the first voltage, which decreases when the switching operation of the switching element in the stopped state is disabled, at a lower-limit voltage higher than the ground voltage of the power factor improvement circuit and clamps the upper limit of the first voltage, which increases when the switching operation of the switching element in the operating state is performed, at an upper-limit voltage.

The power factor improvement circuit and the semiconductor apparatus of the invention allow undershoot or overshoot of an output voltage in performing the burst operation by the power factor improvement circuit to be reduced so that switching loss of the switching power-supply apparatus can be decreased.

BRIEF DESCRIPTION OF THE DRAWINGS

FIG. 4 illustrates a configuration of a Vcomp clamp circuit in accordance with a first embodiment;

FIG. 7 illustrates a configuration of a Vcomp clamp circuit in accordance with a second embodiment;

DETAILED DESCRIPTION

Figure 1:
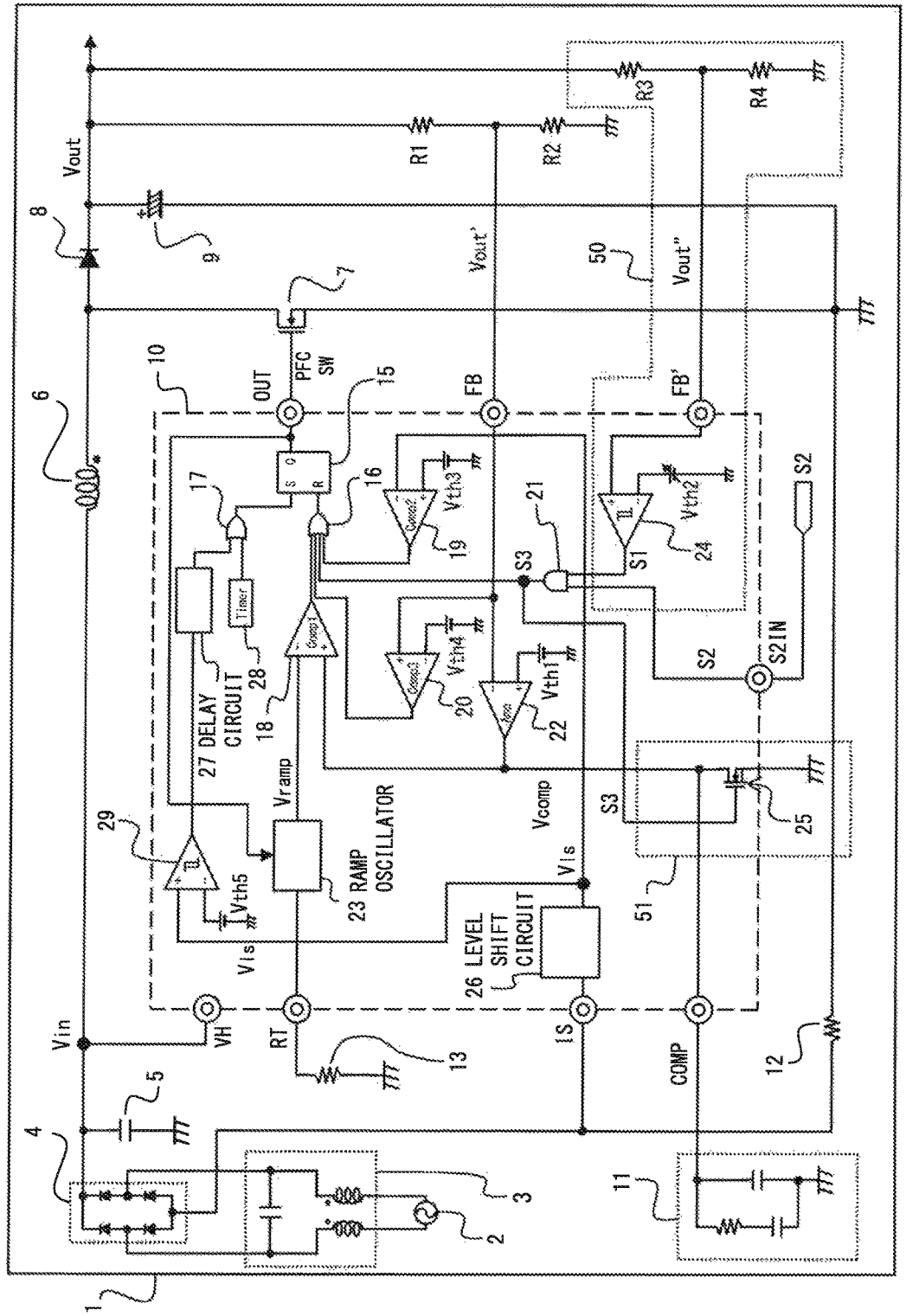
FIG. 1 illustrates a reference example of a switching power-supply apparatus that includes a power factor improvement circuit.

The following describes embodiments of the present invention by referring to the drawings.

FIG. 1 illustrates a reference example of a switching power-supply apparatus that includes a power factor improvement circuit.

As depicted in FIG. 1, a switching power-supply apparatus 1 that includes a power factor improvement circuit includes an AC power supply 2, a filter 3, a bridge diode 4, an input capacitor 5, an inductor 6, a switching element 7, a diode 8, an output capacitor 9, and a control IC 10. The switching power-supply apparatus 1 also includes voltage dividing resistors R1, R2, R3, and R4, a phase compensation circuit 11, and resistors 12 and 13.

The switching power-supply apparatus 1 is used to provide DC power for driving various electronic circuits within an electronic device supplied with commercial AC power. For example, a sinusoidal voltage output from the AC power supply 2 within the switching power-supply apparatus 1 may pass through the filter 3, which includes an inductor and a capacitor, and be full-wave rectified by the bridge diode 4. The input capacitor 5 is intended to eliminate ripple of the voltage after full-wave rectification that could be caused by the switching operation of the switching power-supply apparatus 1. The ripple-eliminated sinusoidal voltage after the full-wave rectification is supplied to the power factor improvement circuit.

The power factor improvement circuit of the switching power-supply apparatus 1 is provided with a voltage boosting converter and performs control such that an input current has an AC waveform having the same phase as an input voltage while performing control such that an output voltage is a DC voltage. The power factor improvement circuit of the switching power-supply apparatus 1 depicted in FIG. 1 includes the inductor 6, the switching element 7, the diode 8, the output capacitor 9, and the control IC 10.

The power factor improvement circuit inputs a full-wave rectified voltage to a circuit having the inductor 6, the switching element 7, and the resistor 12 connected in series, improves the power factor of the AC power supply 2 by controlling the ON/OFF of the switching element 7 via the control IC 10, and obtains a DC voltage Vout by performing rectification and smoothing via the diode 8 and the output capacitor 9.

The control IC 10 of the power factor improvement circuit is a semiconductor apparatus that includes a control circuit for controlling the ON/OFF of the switching element 7 on the basis of the full-wave rectified voltage, the output DC voltage Vout, and the state of the load on the switching power-supply apparatus 1. When a MOSFET is used as the switching element 7, the control IC (semiconductor apparatus) 10 generates a signal (PFC SW) for controlling the ON/OFF of the MOSFET and outputs this signal to the gate of the MOSFET (switching element 7) that is connected to an OUT terminal.

The control IC 10 generates a signal (PFC SW) for controlling the ON/OFF of the switching element (MOSFET) 7 via a flip-flop circuit 15. The flip-flop circuit 15 is of the RS type, wherein an output signal that depends on a combination of a signal input from a first OR circuit 16 to a reset (R) terminal and a signal input from a second OR circuit 17 to a set (S) terminal is output from an output terminal (Q). The first OR circuit 16 and the second OR circuit 17 are provided within the control IC 10.

The first OR circuit 16 outputs the logical sum of an output signal of a first comparator (Comp1) 18, an output signal of a second comparator (Comp2) 19, an output signal of a third comparator (Comp3) 20, and an output signal S3 of an AND circuit 21. The first comparator 18, the second comparator 19, the third comparator 20, and the AND circuit 21 are provided within the control IC 10.

First, descriptions will be given of the first comparator 18. The first comparator 18 outputs a high-level signal or a low-level signal in accordance with the magnitude relationship between an output voltage Vcomp of an error amplifier 22 and an output voltage Vramp of a ramp oscillator 23. The first comparator 18 of the control IC 10 depicted in FIG. 1 includes a non-inverting input terminal (positive input terminal) to which the output voltage Vcomp of the error amplifier 22 is input and an inverting input terminal (negative input terminal) to which the output voltage Vramp of the ramp oscillator 23 is input. Accordingly, the first comparator 18 outputs a high-level signal when the magnitude relationship between the input voltages is Vcomp>Vramp. Meanwhile, the first comparator 18 outputs a low-level signal when the magnitude relationship between the input voltages is Vramp>Vcomp.

The ramp oscillator 23 is provided within the control IC 10 and connected to the resistor 13 via the RT terminal of the control IC 10. The switching power-supply apparatus 1 depicted in FIG. 1 is such that the output voltage Vramp of the ramp oscillator 23 starts to rise from a predetermined initial value with a slope that depends on the resistance value of the resistor 13 connected to the RT terminal, as a result of being triggered on the rising edge of the output signal of the RS flip-flop circuit 15, i.e., in synchrony with the switching element 7 being turned on. The ramp oscillator 23 is an example of the second circuit that outputs a second voltage that starts to rise from a predetermined initial value in synchrony with the switching element being turned on.

The error amplifier 22 is a transconductance amplifier and outputs a current that corresponds to the difference (error) between an input voltage Vout' input via a FB terminal of the control IC 10 and a DC voltage Vth1 of a first internal reference voltage source. The output voltage Vcomp of the error amplifier 22 is generated by the output current of the error amplifier 22 being subjected to a type of integration process performed by the phase compensation circuit 11. The phase compensation circuit 11 also has a function for removing ripple components caused by a sinusoidal amplitude change in the AC power supply 2 from the output voltage Vcomp of the error amplifier 22.

The error amplifier 22 is provided within the control IC 10. The input voltage Vout' input to the error amplifier 22 is a voltage applied to the second voltage dividing resistor R2 when the DC voltage Vout obtained by the power factor improvement circuit is applied to the first voltage dividing resistor R1 and the second voltage dividing resistor R2, which are connected in series. The error amplifier 22 and the phase compensation circuit 11 are an example of the first circuit that outputs a first voltage that corresponds to the error between a reference voltage and a voltage obtained by dividing the output voltage output by the power factor improvement circuit. The first circuit may be such that the error amplifier 22 is not a transconductance amplifier but is a common operational amplifier and the phase compensation circuit is connected between the input and output of this operational amplifier. For example, the voltage dividing resistors R1 and R2 and the phase compensation circuit 11 may be provided on a printed wiring board on which the control IC 10 is implemented.

The output voltage Vcomp of the error amplifier 22 is changed according to a result of detection by an output-voltage detection circuit 50 for the burst operation. The output-voltage detection circuit 50 includes a fourth comparator (hysteresis comparator) 24, a second internal reference voltage source Vth2, and the voltage dividing resistors R3 and R4.

The fourth comparator 24 outputs a high-level signal or a low-level signal in accordance with the magnitude relationship between an input voltage Vout" input via a FB' terminal of the control IC 10 and the DC voltage of the second internal reference voltage source Vth2 (this voltage will also hereinafter be represented as Vth2). The output of the fourth comparator 24 is connected to one input of the AND circuit 21. The output of the AND circuit 21 is connected to the gate of the MOSFET 25 included in a decrease circuit 51 depicted in FIG. 1. The MOSFET 25 of the decrease circuit 51 is provided within the control IC 10. An external signal S2 is input to the other input of the AND circuit 21 via an S2IN terminal. The input voltage Vout" input to the fourth comparator 24 is a voltage obtained by the third voltage dividing resistor R3 and the fourth voltage dividing resistor R4, which are connected in series, dividing the DC voltage Vout output by the power factor improvement circuit. The fourth comparator 24 is provided within the control IC 10. For example, the voltage dividing resistors R3 and R4 may be provided on the printed wiring board on which the control IC 10 is implemented.

The MOSFET 25 included in the decrease circuit 25 depicted in FIG. 1 includes a grounded source and a drain connected to a COMP terminal. Thus, when an output signal S1 of the fourth comparator 24 is a high-level signal and the external signal S2 is a high-level signal, the output signal S3 of the AND circuit 21 becomes a high-level signal, thereby turning on the gate of the MOSFET 25, with the result that the output voltage Vcomp of the error amplifier 22 is decreased to the ground potential (GND potential) of the control IC 10. The external signal S2 indicates a load state, as will be described hereinafter. When the external signal S2 is at a high level, the load state is a light-load state or a no-load state, and this signal serves as a signal to give an instruction to perform a burst operation. The output signal S1 of the fourth comparator 24 and the external signal S2 will hereinafter simply be referred to as a "signal S1" and a "signal S2", respectively.

The output voltage Vcomp of the error amplifier 22 is decreased to the ground potential of the control IC 10 depicted in FIG. 1 in a period in which the switching operation of the switching element 7 is disabled within a period in which the signal S2 is at a high level and thus a burst control mode is active to perform the burst operation. In particular, the control IC 10 depicted in FIG. 1 is such that the decrease circuit 51 performs a decreasing operation when the signal S1 output by the fourth comparator 24 during the burst operation becomes a high-level signal and a period of a stopped state in which the switching operation is disabled (hereinafter referred to as a "disabled period") is entered. When the signal S2 is at a low level and thus the burst control mode is inactive, or during a period in which even when the burst control mode is active, the switching operation of the switching element 7 is enabled as a result of the fourth comparator 24 outputting a low-level signal S1 (hereinafter referred to as an "enabled period"), the output voltage Vcomp of the error amplifier 22 is at a level that corresponds to the input voltage Vout' and the load state.

The fourth comparator 24 is a hysteresis comparator. The reference voltage Vth2 input to the inverting input terminal of the fourth comparator 24 actually comprises two reference voltages Vth2H and Vth2L (Vth2H>Vth2L). Vth2=Vth2L when the output of the fourth comparator 24 is at a high level, and Vth2=Vth2H when the output thereof is at a low level. The output signal S1 of the fourth comparator 24 relative to the input voltage Vout" input to the non-inverting input terminal between Vth2H and Vth2L is at a low level when the reference voltage Vth2H is selected and at a high level when the reference voltage Vth2L is selected.

Next, descriptions will be given of the second comparator 19. The second comparator 19 is intended for overcurrent protection and outputs a high-level signal or a low-level signal in accordance with the magnitude relationship between an output voltage Vls of a level shift circuit 26 and the DC voltage of a third internal reference voltage source Vth3 (this voltage will also hereinafter be represented as Vth3). The second comparator 19 of the control IC 10 depicted in FIG. 1 includes an inverting input terminal to which the voltage Vls is input and a non-inverting input terminal to which the DC voltage Vth3 is input. Accordingly, the second comparator 19 outputs a low-level signal when the magnitude relationship between the input voltages is Vls>Vth3. The second comparator 19 outputs a high-level signal when the magnitude relationship between the input voltages is Vth3>Vls.

The level shift circuit 26 converts a voltage at a first voltage level that is generated by the current flowing through the resistor 12 (equal to the current flowing through the inductor 6) and input to the IS terminal of the control IC 10 into a voltage at a second voltage level that is to be applied within the control IC 10, and outputs the resultant voltage. The voltage at the first voltage level is a negative voltage due to the circuit configuration and thus pulled up by the level shift circuit 26 so as to be converted into a positive voltage Vls that can be handled by the control IC 10. In this case, the positive voltage Vls becomes lower as the current flowing through the resistor 12 increases and becomes higher as the current flowing through the resistor 12 decreases. Accordingly, when the current flowing through the inductor 6 exceeds a reference of overcurrent, Vth3>Vls is satisfied, thereby causing the second comparator 19 to output a high-level signal to reset the flip-flop circuit 15. Note that the level shift circuit 26 is provided within the control IC 10.

Next, descriptions will be given of the third comparator 20. The third comparator 20 is intended for overvoltage protection and outputs a high-level signal or a low-level signal in accordance with the magnitude relationship between the input voltage Vout' input via the FB terminal and the DC voltage of a fourth internal reference voltage source Vth4 (this voltage will also hereinafter be represented as Vth4). The third comparator 20 of the control IC 10 depicted in FIG. 1 includes a non-inverting input terminal to which the input voltage Vout' is input and an inverting input terminal to which the DC voltage Vth4, which serves as a reference for overvoltage protection, is input. Accordingly, the third comparator 20 outputs a high-level signal to reset the flip-flop circuit 15 when the magnitude relationship between the input voltages is Vout'>Vth4. The third comparator 20 outputs a low-level signal when the magnitude relationship between the input voltages is Vth4>Vout'.

Next, descriptions will be given of the AND circuit 21. The AND circuit 21 outputs the logical product of the output signal S1 of the fourth comparator (hysteresis comparator) 24 and the signal S2 (burst control signal) indicating the load state. The signal S2 indicating the load state includes information with which it can be determined whether the switching power-supply apparatus 1 is in a light-load state or a no-load state (i.e., information indicating whether to make the burst control mode active). The signal S2 indicating the load state is input from another circuit (not illustrated) provided outside the control IC 10.

The signal S2 indicating the load state is either a high-level signal or a low-level signal; and the signal S2 is a high-level signal during a light-load state or a no-load state. In this case, the AND circuit 21 outputs a high-level signal only when the switching power-supply apparatus 1 is in a light-load state or a no-load state and the magnitude relationship between the voltages input to the fourth comparator 24 is Vout">Vth2.

As described above, the outputs of the first comparator (Comp1) 18, the second comparator (Comp2) 19, the third comparator (Comp3) 20, and the AND circuit 21 are input to the first OR circuit 16. The first OR circuit 16 outputs a low-level signal only when all of the four input signals are low-level signals. In the case of another combination, i.e., when at least one of the outputs is at a high level, the first OR circuit 16 outputs a high-level signal. The signal output by the first OR circuit 16 is input to the reset (R) terminal of the RS flip-flop circuit 15.

By contrast, the second OR circuit 17 outputs the logical sum of an output signal of a delay circuit 27 and an output signal of a timer 28. The delay circuit 27 delays an output signal of a fifth comparator 29. The fifth comparator 29 is intended to detect a timing at which the current through the inductor 6 becomes zero, so as to implement a critical operation. The fifth comparator 29 includes a non-inverting input terminal to which the output voltage Vls of the level shift circuit 26 is input. A reference voltage Vth5 input to the inverting input terminal of the fifth comparator 29 corresponds to the current through the inductor 6 which is slightly greater than zero. The output of the fifth comparator 29 reaches a high level when the current through the inductor 6 becomes lower than a current that corresponds to the reference voltage Vth5.

The delay circuit 27 is intended to adjust a delay time for each element and to make an adjustment such that a timing at which the output of the fifth comparator 29 reaches a high level is different from the timing at which the current through the inductor 6 becomes zero. The flip-flop circuit 15 is set when a delay time defined by the delay circuit 27 has elapsed after the output of the fifth comparator 29 reached a high level. The fifth comparator 29 is configured as a hysteresis comparator to prevent the output from fluctuating or chattering. The timer 28 is intended to start the switching operation normally when activating the switching power-supply apparatus 1 and has no bearing on the operations other than the starting.

The control IC 10 includes a VH terminal to which Vin, which is the output of the bridge diode 4 and also the input voltage of the power factor improvement circuit, is connected. The VH terminal is intended to generate, in the process of activating the switching power-supply apparatus 1, a constant current from the input voltage Vin so as to charge a capacitor connected to a power-supply terminal (not illustrated) of the control IC 10, thereby ensuring a power-supply voltage for the control IC 10.

Figure 2:
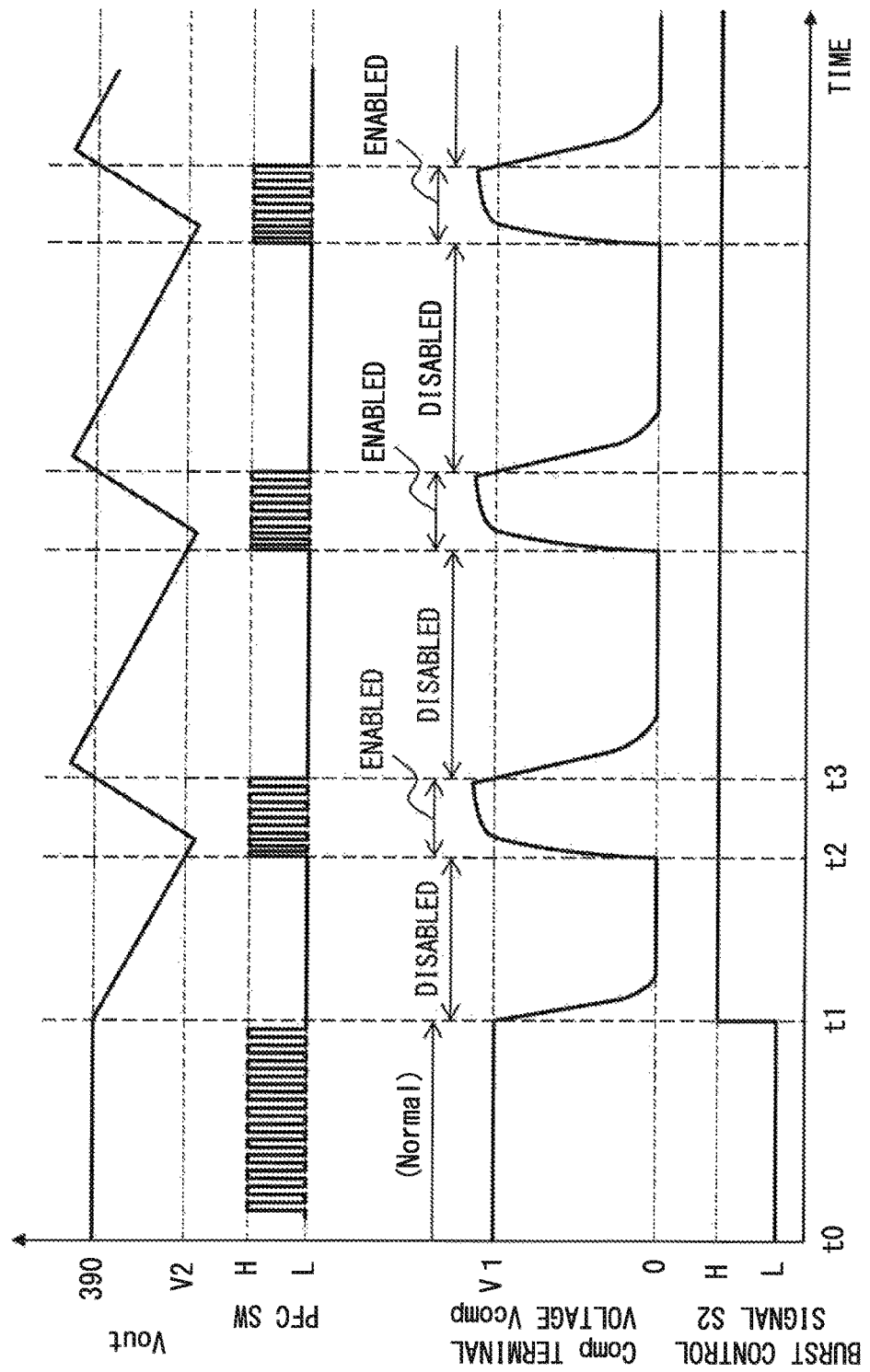
FIG. 2 is a waveform diagram illustrating a burst operation of a switching power-supply apparatus depicted in FIG. 1.

Next, descriptions will be given of the operations of the switching power-supply apparatus 1 depicted in FIG. 1 by referring to FIG. 2. FIG. 2 is a waveform diagram illustrating a burst operation of the switching power-supply apparatus depicted in FIG. 1.

FIG. 2 depicts temporal changes in a DC voltage Vout output by the switching power-supply apparatus 1, a control signal PFC SW for controlling the ON/OFF (switching operation) of the switching element 7, a voltage Vcomp of the COMP terminal, and a burst control signal S2. As depicted in FIG. 1, the control signal PFC SW is an output signal of the flip-flop circuit 15.

The burst control signal S2 in the waveform diagram in FIG. 2 is, as described above, a signal that includes information indicating the load state of the switching power-supply apparatus 1, i.e., a signal input from another circuit provided outside the control IC 10 to the control IC 10. The burst control signal S2 is at a high level (H) when the load state is light load or no load, and is otherwise at a low level (L). Accordingly, when the burst control signal S2 is a low-level signal, the control IC 10 is in an operating state in which the burst control mode is not active (i.e., a state in which the normal switching operation, rather than the burst operation, is performed).

The waveform diagram depicted in FIG. 2 indicates that the burst control signal S2 is at the low level during the period from time t0 to time t1. Hence, the ON/OFF control of the switching element 7 performed by the control IC 10 during the period from time t0 to time t1 does not involve the burst operation (so-called normal control is performed). Thus, the signal PFC SW input to the switching element 7 is switched between High (H) and Low (L) in series, and the voltage Vcomp of the COMP terminal is maintained at a voltage V1 that corresponds to the input voltage Vout' and the load state. Accordingly, the DC voltage Vout output by the switching power-supply apparatus 1 is maintained at a predetermined value (390V with reference to FIG. 2).

When, for example, a circuit provided outside the control IC 10 detects at time t1 that the load state is light load or no load, the burst control signal S2 input to the control IC 10 is switched from the low level (L) to the high level (H). Hence, the burst control mode is activated in the control IC 10.

In FIG. 2, Vout=390V corresponds to a reference voltage Vth2H input to the hysteresis comparator (fourth comparator) 24, and V2 corresponds to a reference voltage Vth2L. Since Vout reaches 390V in the normal operation, the output of the hysteresis comparator 24 reaches the high level at time t1. Accordingly, the burst control signal S2 reaches the high level to activate the burst control mode, thereby causing the output signal S3 of the AND circuit 21 to reach the high level and causing the reset input of the flip-flop circuit 15 to reach the high level, with the result that, as depicted in FIG. 2, the switching power-supply apparatus 1 is first operated with the switching operation of the switching element 7 disabled (with the switching element 7 stopped in an OFF state). In the meantime, during the switching-operation disabled period in the burst operation in which the output signal S3 of the AND circuit 21 is at the high level, the gate of the MOSFET 25 of the decrease circuit 51 is turned on, thereby decreasing, as described above, the voltage Vcomp of the COMP terminal to the ground potential (0V with reference to FIG. 2) of the control IC 10. Decreasing the voltage Vcomp of the COMP terminal during the switching-operation disabled period in this way allows the voltage Vcomp to increase to an upper limit in accordance with a decrease in the DC voltage Vout, so that the ON width can be prevented from being maximized when the switching-operation disabled period is switched to the enabled period.

As the switching operation is stopped, the DC voltage Vout output from the power factor improvement circuit of the switching power-supply apparatus 1 decreases with time and becomes the predetermined potential V2 at time t2. At time t2, at which the DC voltage Vout decreases to the predetermined potential V2, the output signal S1 of the hysteresis comparator 24 and the output signal S3 of the AND circuit 21 are switched to the low level, thereby releasing the reset input of the flip-flop circuit 15, with the result that the burst operation performed by the switching power-supply apparatus 1 is switched from the operation of disabling the switching operation to the operation of enabling the switching operation. In particular, the switching power-supply apparatus 1 resumes the switching operation of the switching element 7 at time t2. Meanwhile, as described above, the gate of the MOSFET 25 of the decrease circuit 51 is in an off state during the switching-operation enabled period in the burst operation. Thus, at time t2 and thereafter, the voltage Vcomp of the COMP terminal rises to an ON width V1 that corresponds to the difference between the DC voltage Vth1 and the input voltage Vout' input to the error amplifier 22 and then continues to rise as the input voltage Vout' and the DC voltage Vth1 still have a difference therebetween. With the rise in the voltage Vcomp of the COMP terminal, the DC voltage Vout output from the switching power-supply apparatus 1 rises and reaches a voltage that corresponds to the reference voltage Vth2H at time t3. Hence, at time t3, the output signal S1 of the hysteresis comparator 24 and the output signal S3 of the AND circuit 21 are switched to the high level again, and the burst operation performed by the switching power-supply apparatus 1 is switched from the operation of enabling the switching operation to the operation of disabling the switching operation. Then, the switching power-supply apparatus 1 repeatedly performs the operation of disabling the switching operation and the operation of enabling the switching operation until the burst control signal S2 reaches the low level (L).

As described above, the switching power-supply apparatus 1 depicted in FIG. 1 is such that the phase compensation circuit 11, including the capacitor for phase compensation, is connected to the COMP terminal of the control IC 10. In the switching power-supply apparatus 1 depicted in FIG. 1, accordingly, major undershoot of the DC voltage Vout would occur at a timing at which the switching-operation disabled period is switched to the enabled period, and major overshoot of the DC voltage Vout would occur at a timing at which the enabled period is switched to the disabled period.

The voltage Vcomp of the COMP terminal has already been decreased to the GND potential of the control IC 10 at a timing at which the switching-operation disabled period is switched to the enabled period (e.g., time t2 with reference to FIG. 2). Hence, the voltage Vcomp does not rise as soon as the switching operation of the switching element 7 is started at time t2, and it will take some time before achieving an ON width such that the DC voltage Vout can be raised. Accordingly, even though the switching operation is started at time t2, the DC voltage Vout continues to be reduced until the voltage Vcomp achieves an ON width such that the output voltage Vout can be raised, thereby leading to undershoot of the DC voltage Vout.

At a timing at which the switching-operation enabled period is switched to the disabled period (e.g., time t3 with reference to FIG. 2), by contrast, an excessively large current could flow through the inductor 6 depending on the ON width at that time. Thus, even though the operation of the switching element 7 is stopped at time t3, the DC voltage Vout continues to be output, thereby leading to overshoot.

In the switching power-supply apparatus 1 depicted in FIG. 1, as described above, major undershoot or overshoot of the DC voltage Vout could occur during the burst operation. Hence, the DC voltage Vout provided during the burst operation in the switching power-supply apparatus 1 depicted in FIG. 1 could be out of the input voltage range of the converter in the subsequent stage. This condition could lead to a reduction in the efficiency of the conversion based on the switching operation by the converter, i.e., an increase in power loss, in the subsequent stage.

The following describes a switching power-supply apparatus 1 that can reduce undershoot or overshoot of a DC voltage Vout that could occur during the burst operation.

First Embodiment

Figure 3:
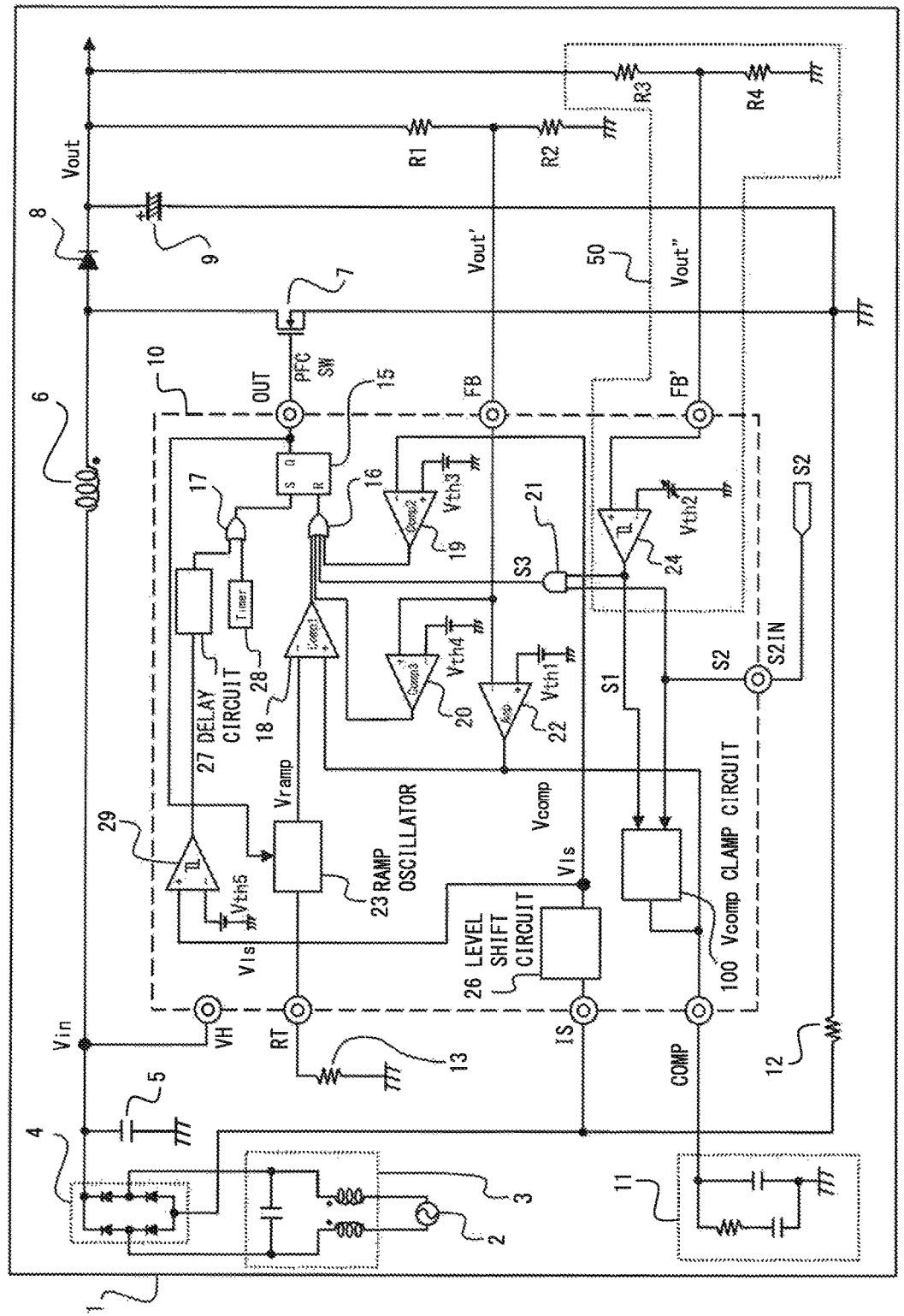
FIG. 3 illustrates the circuit configuration of a switching power-supply apparatus in accordance with a first embodiment.

FIG. 3 illustrates the circuit configuration of a switching power-supply apparatus in accordance with a first embodiment.

The switching power-supply apparatus 1 depicted in FIG. 3 includes an AC power supply 2, a filter 3, abridge diode 4, an input capacitor 5, an inductor 6, a switching element 7, a diode 8, an output capacitor 9, and a control IC 10. The switching power-supply apparatus 1 also includes voltage dividing resistors R1, R2, R3, and R4, a phase compensation circuit 11, and resistors 12 and 13.

As with the switching power-supply apparatus 1 depicted in FIG. 1, the switching power-supply apparatus 1 depicted in FIG. 3 includes a power factor improvement circuit provided with a voltage boosting converter. The power factor improvement circuit of the switching power-supply apparatus 1 depicted in FIG. 3 includes the inductor 6, the switching element 7, the diode 8, the output capacitor 9, and the control IC 10.

The configuration of the switching power-supply apparatus 1 in accordance with the present embodiment is the same as that of the switching power-supply apparatus 1 depicted in FIG. 1 except that as depicted in FIG. 3, the control IC 10 of the former includes a Vcomp clamp circuit 100 in place of the decrease circuit 51.

The Vcomp clamp circuit 100 clamps (limits) the voltage Vcomp of the COMP terminal during the burst operation within a predetermined voltage range on the basis of the output signal S1 of the fourth comparator 24 and the signal (burst control signal) S2 input from outside to the control IC 10 that indicates the load state. Specifically, the lower limit of the voltage Vcomp during the switching-operation disabled period is set to a lower-limit voltage Vclp_L higher than the GND potential of the control IC 10, and the upper limit of the voltage Vcomp during the switching-operation enabled period is set to an upper-limit voltage Vclp_H lower than the potential of the voltage Vcomp during the non-burst operation.

A sinusoidal voltage output from the AC power supply 2 in the switching power-supply apparatus 1 in accordance with the present embodiment passes through the filter 3, which includes an inductor and a capacitor, and is full-wave rectified by the bridge diode 4. Ripple of the voltage after the full-wave rectification that results from the switching operation is eliminated by the input capacitor 5, and then this voltage is supplied to the power factor improvement circuit. The power factor improvement circuit inputs the full-wave rectified voltage with ripple eliminated to a circuit having the inductor 6, the switching element 7, and the resistor 12 connected in series, improves the power factor of the AC power supply 2 by controlling the ON/OFF of the switching element 7 via the control IC 10, and obtains a DC voltage Vout by performing rectification and smoothing via the diode 8 and the output capacitor 9.

The control IC 10 of the power factor improvement circuit is a semiconductor apparatus that includes a control circuit for controlling the ON/OFF of the switching element 7 on the basis of the full-wave rectified voltage with ripple eliminated, the output DC voltage Vout, and the state of the load on the switching power-supply apparatus 1. When a MOSFET is used as the switching element 7, the control IC 10 generates a signal (PFC SW) for controlling the ON/OFF of the MOSFET and outputs this signal to the gate of the MOSFET (switching element 7) that is connected to an OUT terminal.

The control IC 10 generates a signal (PFC SW) for controlling the ON/OFF of the switching element (MOSFET) 7 via a flip-flop circuit 15. The flip-flop circuit 15 is of the RS type, and an output signal that corresponds to a combination of a signal input from a first OR circuit 16 to a reset (R) terminal and a signal input from a second OR circuit 17 to a set (S) terminal is output from an output terminal (Q). The first OR circuit 16 and the second OR circuit 17 are provided within the control IC 10.

The first OR circuit 16 outputs the logical sum of an output signal of a first comparator (Comp1) 18, an output signal of a second comparator (Comp2) 19, an output signal of a third comparator (Comp3) 20, and an output signal S3 of an AND circuit 21.

The first comparator 18 outputs a high-level signal or a low-level signal in accordance with the magnitude relationship between an output voltage Vcomp of an error amplifier 22 and an output voltage Vramp of a ramp oscillator 23. The first comparator 18 outputs a high-level signal when the magnitude relationship between the voltages is Vcomp>Vramp. Meanwhile, the first comparator 18 outputs a low-level signal when the magnitude relationship between the voltages is Vramp>Vcomp. The error amplifier 22 and the phase compensation circuit 11 are an example of the first circuit that outputs a first voltage that corresponds to the error between a reference voltage and a voltage obtained by dividing the DC voltage Vout output by the power factor improvement circuit. The ramp oscillator 23 is an example of the second circuit that outputs a second voltage that rises in response to the switching element being turned on.

The second comparator 19 is intended for overcurrent protection and outputs a high-level signal or a low-level signal in accordance with the magnitude relationship between an output voltage Vls of a level shift circuit 26 and a DC voltage Vth3 of a third internal reference voltage source Vth3. The second comparator 19 outputs a low-level signal when the magnitude relationship between the voltages is Vls>Vth3. The second comparator 19 outputs a high-level signal when the magnitude relationship between the voltages is Vth3>Vls.

As the voltage generated by the current flowing through the resistor 12 (equal to the current flowing through the inductor 6) and input to the IS terminal of the control IC 10 is a negative voltage, the level shift circuit 26 pulls up and thus converts this voltage into a positive voltage Vls. The positive voltage Vls becomes lower as the current flowing through the resistor 12 increases and becomes higher as the current flowing through the resistor 12 decreases. Accordingly, when the current flowing through the inductor 6 exceeds a reference of overcurrent, Vth3>Vls is satisfied, thereby causing the second comparator 19 to output a high-level signal to reset the flip-flop circuit 15.

The third comparator 20 is intended for overvoltage protection and outputs a high-level signal or a low-level signal in accordance with the magnitude relationship between the input voltage Vout' input via the FB terminal and the DC voltage Vth4 of a fourth internal reference voltage source Vth4. The third comparator 20 outputs a high-level signal to reset the flip-flop circuit 15 when the magnitude relationship between the voltages is Vout'>Vth4. The third comparator 20 outputs a low-level signal when the magnitude relationship between the voltages is Vth4>Vout'.

The AND circuit 21 outputs a logical product S3 of the output signal S1 of the fourth comparator (hysteresis comparator) 24 and a signal (burst control signal) S2 indicating the load state. The signal S2 indicating the load state is input from another circuit (not illustrated) provided outside the control IC 10.

By contrast, the second OR circuit 17 outputs the logical sum of an output signal of a delay circuit 27 and an output signal of a timer 28. The delay circuit 27 delays an output signal of a fifth comparator 29. The fifth comparator 29 is intended to detect a timing at which the current through the inductor 6 becomes zero, so as to implement a critical operation. The fifth comparator 29 includes a non-inverting input terminal to which the output voltage Vls of the level shift circuit 26 is input. A reference voltage Vth5 input to the inverting input terminal of the fifth comparator 29 corresponds to the current through the inductor 6 which is slightly greater than zero. The output of the fifth comparator 29 reaches a high level when the current through the inductor 6 becomes lower than a current that corresponds to the reference voltage Vth5.

The delay circuit 27 is intended to adjust a delay time for each element and to make an adjustment such that a timing at which the output of the fifth comparator 29 reaches a high level is different from the timing at which the current through the inductor 6 becomes zero. The flip-flop circuit 15 is set when a delay time defined by the delay circuit 27 has elapsed after the output of the fifth comparator 29 reached a high level. The fifth comparator 29 is configured as a hysteresis comparator to prevent the output from fluctuating or chattering. The timer 28 is intended to start the switching operation normally when activating the switching power-supply apparatus 1 and has no bearing on the operations other than the starting.

FIG. 4 illustrates a configuration of a Vcomp clamp circuit in accordance with the first embodiment.

As depicted in FIG. 4, the Vcomp clamp circuit 100 in accordance with the present embodiment includes two p-channel MOSFETs 101 and 102, two n-channel MOSFETs 103 and 104, and two current sources 105 and 106. The Vcomp clamp circuit 100 also includes a NOT circuit (inverter) 107, two operational amplifiers 108 and 109, an AND circuit 110, and an OR circuit 120.

The two p-channel MOSFETs 101 and 102 are connected in series in such a manner as to connect the drain of the first p-channel MOSFET 101 and the source of the second p-channel MOSFET 102. The source of the first p-channel MOSFET 101 is connected to a power supply VDD via the first current source 105. The drain of the second p-channel MOSFET 102 is connected to the drain of the first n-channel MOSFET 103. In addition, the back gate of the first p-channel MOSFET 101 and the back gate of the second p-channel MOSFET 102 are each connected to the power supply VDD.

The two n-channel MOSFETs 103 and 104 are connected in series in such a manner as to connect the source of the first n-channel MOSFET 103 and the drain of the second n-channel MOSFET 104. As described above, the drain of the first n-channel MOSFET 103 is connected to the drain of the second p-channel MOSFET 102. The source of the second n-channel MOSFET 104 is grounded via the second current source 106. In addition, the back gate of the first n-channel MOSFET 103 and the back gate of the second n-channel MOSFET 104 are each grounded.

The output of the OR circuit 120 is connected to the gate of the first p-channel MOSFET 101. The OR circuit 120 has input thereto a signal obtained by the NOT circuit (inverter) 107 inverting the logical level of the burst control signal S2 and the output signal S1 of the fourth comparator 24. As described above, the logical level of the burst control signal S2 is High (H) when the load state is light load or no load. Meanwhile, the output signal S1 of the fourth comparator 24 functions, as described above, as a switching signal for switching between the disabled period (S1 is high level) and the enabled period (S1 is low level) for the switching operation during the burst operation. Owing to this configuration, only during the switching-operation enabled period in the burst operation, the low-level signal is applied to the gate of the first p-channel MOSFET 101, thereby turning on the first p-channel MOSFET 101.

An output signal of the first operational amplifier (Amp1) 108 is input to the gate of the second p-channel MOSFET 102. The first operational amplifier 108 includes a non-inverting input terminal (positive input terminal) to which the drain of the second p-channel MOSFET 102 is connected and an inverting input terminal (negative input terminal) to which the upper-limit voltage Vclp_H is input. When the first p-channel MOSFET 101 is in on state, the second p-channel MOSFET 102 is in an active state triggering an operation of virtually short-circuiting the two inputs of the first operational amplifier (Amp1) 108, with the result that the drain voltage V3 of the second p-channel MOSFET 102 becomes equal to the upper-limit voltage Vclp_H. The virtual short-circuiting operation is performed during the switching-operation enabled period and thus serves in a direction such that the voltage V3 rises, and the rate of this operation is controlled primarily in accordance with the magnitude of the current of the current source 105. Accordingly, the voltage V3 rises during a certain period of time, and upon the voltage V3 reaching the upper-limit voltage Vclp_H, the virtual short-circuiting operation is completed, thereby clamping the voltage V3 at the upper-limit voltage Vclp_H. When the first p-channel MOSFET 101 is in off state, the second p-channel MOSFET 102 is in an inactive state, and hence the COMP terminal voltage Vcomp is equal to the drain voltage V4 of the first n-channel MOSFET 103.

An output signal of the second operational amplifier (Amp2) 109 is input to the gate of the first n-channel MOSFET 103. The second operational amplifier 109 includes a non-inverting input terminal to which the drain of the first n-channel MOSFET 103 is connected and an inverting input terminal to which the lower-limit voltage Vclp_L is input. When the second n-channel MOSFET 104 is in on state, the first n-channel MOSFET 103 is in an active state triggering an operation of virtually short-circuiting the two inputs of the second operational amplifier (Amp2) 109, with the result that the drain voltage V4 of the first n-channel MOSFET 103 becomes equal to the lower-limit voltage Vclp_L. The virtual short-circuiting operation is performed during the switching-operation disabled period and thus serves in a direction such that the voltage V4 decreases, and the rate of this operation is controlled primarily in accordance with the magnitude of the current of the current source 106. Accordingly, the voltage V4 decreases during a certain period of time, and upon the voltage V4 reaching the lower-limit voltage Vclp_L, the virtual short-circuiting operation is completed, thereby clamping the voltage V4 at the lower-limit voltage Vclp_L. When the second n-channel MOSFET 104 is in off state, the first n-channel MOSFET 103 is in an inactive state, and hence the COMP terminal voltage Vcomp is equal to the drain voltage V3 of the second p-channel MOSFET 102.

The output signal of the AND circuit 110 is input to the gate of the second n-channel MOSFET 104. The AND circuit 110 outputs the logical product of the burst control signal S2 indicating the load state and the signal S1 for switching between the disabled period and the enabled period for the switching operation during the burst operation. As described above, the burst control signal S2 is at the high level when the load state is light load or no load, and is otherwise at the low level. The signal S1 becomes a high-level signal when indicating the disabled period and becomes a low-level signal when indicating the enabled period. Owing to this configuration, only during the switching-operation disabled period in the burst operation, the high-level signal is applied to the gate of the second n-channel MOSFET 104, thereby turning on the second n-channel MOSFET 104.

Figure 5:
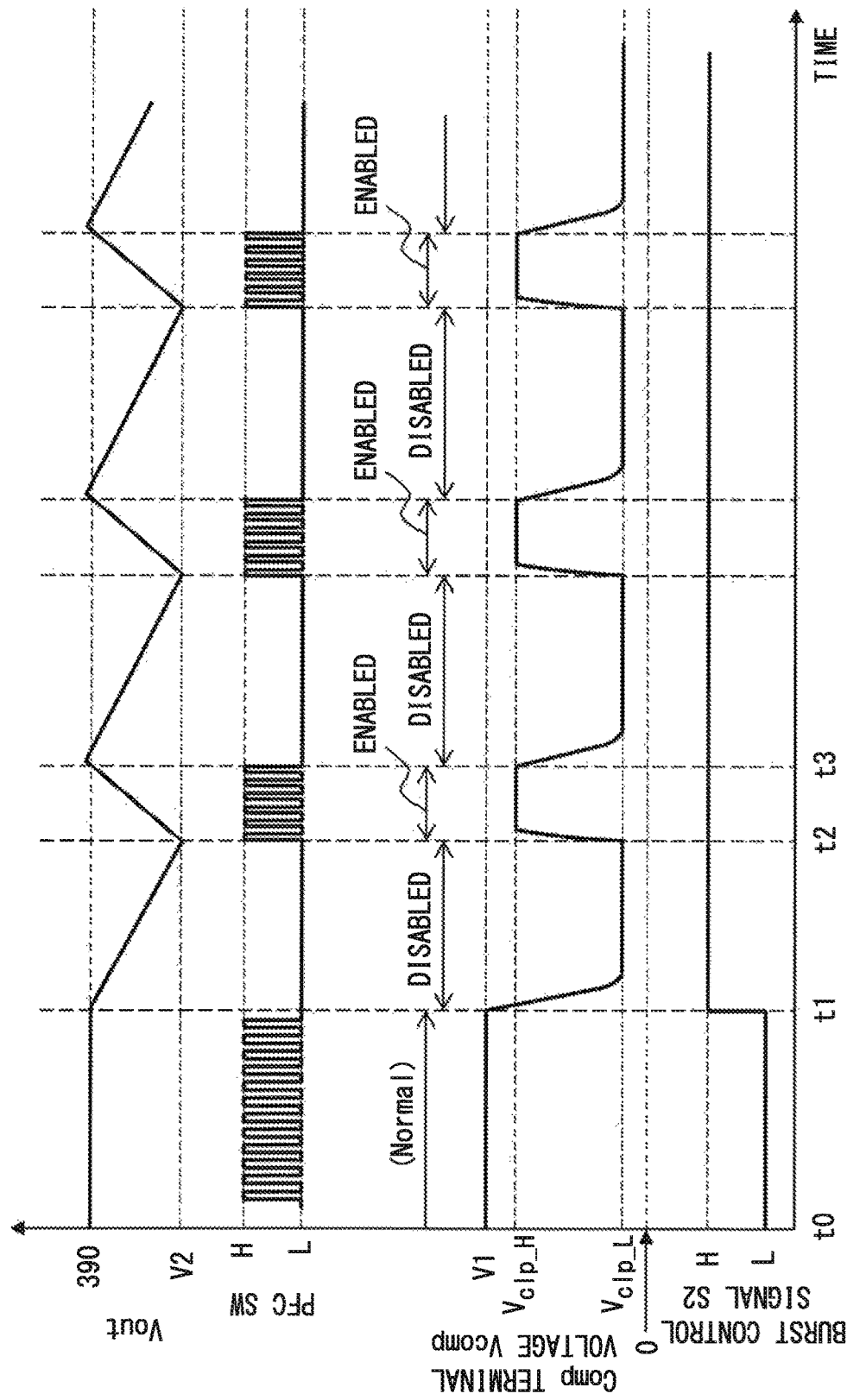
FIG. 5 is a waveform diagram illustrating a burst operation of a switching power-supply apparatus in accordance with a first embodiment.

Next, descriptions will be given of the operations of the switching power-supply apparatus 1 in accordance with the present embodiment that includes the Vcomp clamp circuit 100 depicted in FIG. 4 by referring to FIG. 5. FIG. 5 is a waveform diagram illustrating the burst operation of the switching power-supply apparatus in accordance with the first embodiment.

FIG. 5 depicts temporal changes in a DC voltage Vout output by the switching power-supply apparatus 1 in accordance with the present embodiment that includes the Vcomp clamp circuit 100 depicted in FIG. 4, a control signal PFC SW for controlling the ON/OFF of the switching element 7, a voltage Vcomp of the COMP terminal, and a burst control signal S2.

The burst control signal S2 in the waveform diagram in FIG. 5 is, as described above, a signal that includes information indicating the load state of the switching power-supply apparatus 1, i.e., a signal input from another circuit provided outside the control IC 10 to the control IC 10. The burst control signal S2 is at a high level (H) when the load state is light load or no load, and is otherwise at a low level (L). Accordingly, when the burst control signal S2 is a low-level signal, the control IC 10 is in an operating state in which the burst control mode is not active (i.e., a normal state in which the burst operation is not performed).

The waveform diagram depicted in FIG. 5 indicates that the burst control signal S2 is at the low level (L) during the period from time t0 to time t1. Hence, the ON/OFF control of the switching element 7 performed by the control IC 10 during the period from time t0 to time t1 does not involve the burst operation (so-called normal control is performed). In addition, the Vcomp clamp circuit 100 does not perform the clamp operation since the first p-channel MOSFET 101 and the second n-channel MOSFET 104 of the Vcomp clamp circuit 100 are in off state. Thus, the signal PFC SW input to the switching element 7 is switched between High (H) and Low (L) in series, and the voltage Vcomp of the COMP terminal is maintained at a voltage V1 that corresponds to an input voltage Vout' and the load state. Accordingly, the DC voltage Vout output by the switching power-supply apparatus 1 is maintained at a predetermined value (390V with reference to FIG. 5).

In FIG. 5, Vout=390V corresponds to a reference voltage Vth2H input to the hysteresis comparator 24, and V2 corresponds to a reference voltage Vth2L. Since Vout reaches 390V in the normal operation, the output S1 of the hysteresis comparator 24, i.e., the switching signal S1 for switching between the disabled period and the enabled period for the switching operation, reaches the high level at time t1.

When, for example, a circuit provided outside the control IC 10 detects at time t1 that the load state is light load or no load, the burst control signal S2 input to the control IC 10 is switched from the low level (L) to the high level (H). Hence, the burst control mode is activated in the control IC 10. Meanwhile, as the burst control signal S2 input to the control IC 10 is switched to the high level (H) and the switching signal S1 is at the high level, the first p-channel MOSFET 101 of the Vcomp clamp circuit 100 is in off state, and the second n-channel MOSFET 104 thereof is in on state. Thus, a circuit for clamping the voltage Vcomp of the COMP terminal at the lower-limit voltage Vclp_L by means of the second operational amplifier (Amp2) 109 is operated in the Vcomp clamp circuit 100.

When the burst control mode is activated to start the burst operation at time t1, the switching power-supply apparatus 1 will first be operated with the switching operation of the switching element 7 disabled as indicated in FIG. 5 since th switching signal S1 is at the high level. Hence, at time t1 and thereafter, the DC voltage Vout output from the power factor improvement circuit will decrease with time. During the switching-operation disabled period, while the voltage Vcomp of the COMP terminal also decreases, a circuit for clamping the lower limit of the voltage Vcomp of the COMP terminal at the lower-limit voltage Vclp_L by means of the second operational amplifier (Amp2) 109 is operated in the Vcomp clamp circuit 100. Accordingly, the voltage Vcomp of the COMP terminal during the switching-operation disabled period is clamped at the lower-limit voltage Vclp_L higher than the ground potential of control IC 10.

Subsequently, at time t2, at which the DC voltage Vout decreases to the predetermined potential V2, the output S1 of the hysteresis comparator 24 is switched to the low level, thereby switching the burst operation performed by the switching power-supply apparatus 1 from the operation of disabling the switching operation to the operation of enabling the switching operation. In particular, the switching power-supply apparatus 1 resumes the switching operation of the switching element 7 at time t2. In this case, the burst control signal S2 input to the AND circuit 110 of the Vcomp clamp circuit 100 remains as a high-level signal, while the switching signal S1 is at the low level (L) indicating the enabled period. Accordingly, the output signal of the AND circuit 110 is switched from the high level (H) to the low level (L), and the second n-channel MOSFET 104 is in off state. Meanwhile, the switching signal S1 is at the low level indicating the enabled period and the output of the OR circuit 120 is also at the low level, thereby turning on the first p-channel MOSFET 101. Accordingly, at time t2 and thereafter, only the circuit for clamping the upper limit of the voltage Vcomp of the COMP terminal at the upper-limit voltage Vclp_H by means of the first operational amplifier 108 is operated in the Vcomp clamp circuit 100.

After time t2, the switching power-supply apparatus 1 resumes the operation of the switching element 7, thereby raising the DC voltage Vout. Meanwhile, the circuit for decreasing the voltage Vcomp of the COMP terminal is stopped and the circuit for increasing this voltage is operated in the Vcomp clamp circuit 100, thereby raising the voltage Vcomp of the COMP terminal, but the voltage Vcomp is clamped at the upper-limit voltage Vclp_H. Accordingly, the voltage Vcomp of the COMP terminal during the switching-operation enabled period is clamped at the upper-limit voltage Vclp_H lower than the voltage V1 provided during the non-burst operation.

At time t3, at which the DC voltage Vout returns to a predetermined potential (390V with reference to FIG. 5), the output S1 of the hysteresis comparator 24 is switched to the high level, thereby switching the burst operation performed by the switching power-supply apparatus 1 from the operation of enabling the switching operation back to the operation of disabling the switching operation. Then, the switching power-supply apparatus 1 repeatedly performs the operation of disabling the switching operation and the operation of enabling the switching operation until the burst control signal S2 reaches the low level (L).

As described above, the switching power-supply apparatus 1 in accordance with the present embodiment limits the voltage Vcomp of the COMP terminal during the burst operation within the range from the upper-limit voltage Vclp_H to the lower-limit voltage Vclp_L. Hence, the voltage Vcomp of the COMP terminal at the switching from the disabled state to the enabled state for the switching operation in the switching power-supply apparatus 1 in accordance with the present embodiment can be set at a potential higher than that of the voltage Vcomp (GND potential) at the switching in the switching power-supply apparatus 1 depicted in FIG. 1. Hence, an ON width such that the voltage Vcomp of the COMP terminal can raise the DC voltage Vout can be achieved in a shorter time after the switching operation of the switching element 7 is started at time t2. In addition, the length of an ON time of the switching element that is determined by the voltage Vcomp of the COMP terminal is nonzero, i.e., a significant length, even just after the switching from the disabled period to the enabled period for the switching operation, so that undershoot of the DC voltage Vout just after switching can be reduced.

The switching power-supply apparatus 1 in accordance with the present embodiment is such that the voltage Vcomp at the timing (time t3) at which the enabled period is switched to the disabled period for the switching operation is clamped at the upper-limit voltage Vclp_H lower than the potential (V1) provided during the non-burst operation. Thus, the switching power-supply apparatus 1 in accordance with the present embodiment allows only low current to pass through the inductor 6 at the timing of switching from the enabled period to the disabled period for the switching operation, so that overshoot of the DC voltage Vout can be reduced.

Accordingly, the switching power-supply apparatus 1 in accordance with the present embodiment can prevent an occurrence of a period in which the DC voltage Vout cannot be output due to major undershoot or overshoot of the DC voltage Vout during the burst operation. Thus, the switching power-supply apparatus 1 that includes the power factor improvement circuit in accordance with the present embodiment can avoid, or reduce, a period in which an output voltage cannot be sent effectively to a load when the converter in the subsequent stage performs a switching operation, thereby decreasing switching loss.

The Vcomp clamp circuit 100 of the switching power-supply apparatus 1 in accordance with the present embodiment is not limited to the configuration depicted in FIG. 4 and can be modified as appropriate. For example, the Vcomp clamp circuit 100 may be a circuit that can change the upper-limit voltage Vclp_H for the voltage Vcomp of the COMP terminal during the burst operation on the basis of a signal Vinh that includes information on an input voltage.

Figure 6:
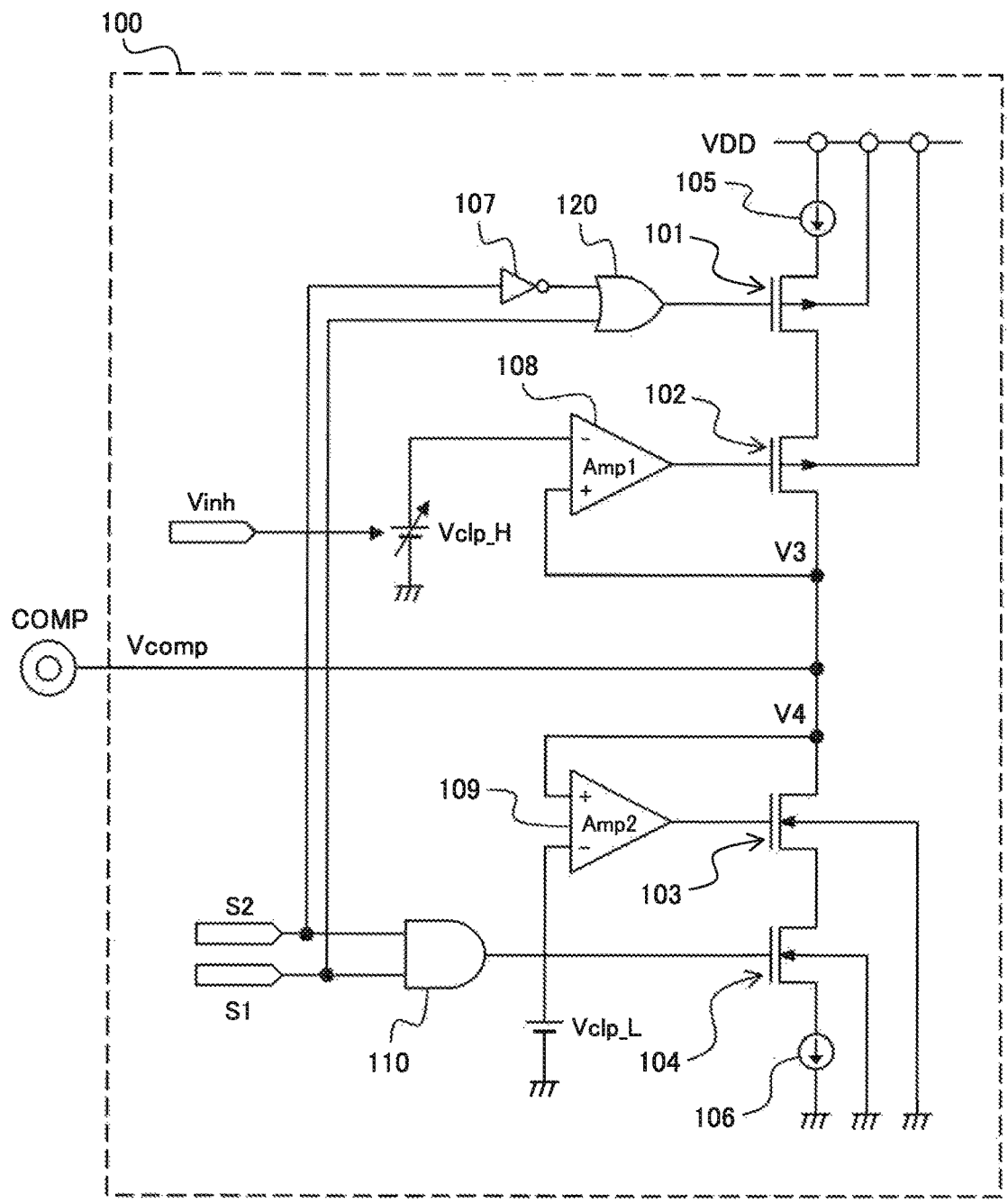
FIG. 6 illustrates another configuration of a Vcomp clamp circuit in accordance with a first embodiment.

FIG. 6 illustrates another configuration of the Vcomp clamp circuit in accordance with the first embodiment.

As with the Vcomp clamp circuit 100 depicted in FIG. 4, the Vcomp clamp circuit 100 depicted in FIG. 6 includes two p-channel MOSFETs 101 and 102, two n-channel MOSFETs 103 and 104, and two current sources 105 and 106. The Vcomp clamp circuit 100 depicted in FIG. 6 also includes a NOT circuit 107, a first operational amplifier (Amp1) 108, a second operational amplifier (Amp2) 109, an AND circuit 110, and an OR circuit 120.

The Vcomp clamp circuit 100 depicted in FIG. 6 is different from the Vcomp clamp circuit 100 depicted in FIG. 4 in that the voltage source for supplying the upper-limit voltage Vclp_H to be input to the first operational amplifier 108 has been replaced with a variable voltage source that can vary the potential of the upper-limit voltage Vclp_H in accordance with a signal Vinh that includes information on an input voltage. For example, the signal Vinh that includes information on an input voltage may be a signal generated by comparing the output of a peak-hold circuit for a division of a voltage Vin input to the control IC 10 with a reference voltage for determining the high/low of the peak values of the voltage Vin. Owing to this signal, it can be determined, for example, whether the AC power supply 2 is a 100V power supply or a 200V power supply. Accordingly, making the upper-limit voltage Vclp_H variable allows overshoot of the DC voltage Vout just after switching from the disabled period to the enabled period for the switching operation to be limited more appropriately. Thus, a period in which the DC voltage Vout cannot be output due to overshoot can be made even shorter, thereby further decreasing switching loss during the burst operation.

Second Embodiment

The present embodiment will be described by referring to a still another configuration of the Vcomp clamp circuit 100 of the switching power-supply apparatus 1 depicted in FIG. 3.

FIG. 7 illustrates a configuration of a Vcomp clamp circuit in accordance with the second embodiment.

As depicted in FIG. 7, the Vcomp clamp circuit 100 in accordance with the present embodiment includes two p-channel MOSFETs 101 and 102, one n-channel MOSFET 103, one current source 105, and one pull-out resistor 111. The Vcomp clamp circuit 100 also includes a NOT circuit 107, one operational amplifier 108, two AND circuits 110 and 112, a hysteresis comparator 113, and an OR circuit 120.

The Vcomp clamp circuit 100 depicted in FIG. 7 is different from the one depicted in FIG. 4 in that the former does not include any of the n-channel MOSFET 104, the operational amplifier 109, and the current source 106 depicted in FIG. 4 but does include the pull-out resistor 111, the AND circuit 112, and the hysteresis comparator 113. The following descriptions are given of the components and operations different from those indicated in FIG. 4 with descriptions of the same components and operations omitted.

The output signal of the AND circuit 112 is input to the gate of the n-channel MOSFET 103. The AND circuit 112 outputs the logical product of the output signal of the AND circuit 110 and the output signal of the hysteresis comparator 113.

As described above, the AND circuit 110 outputs the logical product of the burst control signal S2 and the switching signal S1 for switching between the disabled period and the enabled period for the switching operation.

The hysteresis comparator 113 outputs a high-level signal or a low-level signal in accordance with the magnitude relationship between an output voltage Vcomp of the COMP terminal and a lower-limit voltage (Vclp_L or (Vclp_L-ΔV)), where the difference ΔV (>0) between the lower-limit voltage Vclp_L and is a hysteresis voltage width of the hysteresis comparator 113 and is a voltage smaller than the voltage Vclp_L. The hysteresis comparator 113 includes a non-inverting input terminal to which the voltage Vcomp of the COMP terminal is input and an inverting input terminal to which the lower-limit voltage Vclp_L or (Vclp_L-ΔV) is input in accordance with whether the output of the hysteresis comparator 113 is at the high level or the low level. Hence, when the hysteresis comparator 113 outputs a high-level signal, the output of the hysteresis comparator 113 will be inverted to the low level when the voltage Vcomp is decreased to (Vclp_L-ΔV). Meanwhile, when the hysteresis comparator 113 outputs a low-level signal, the output of the hysteresis comparator 113 will be inverted to the high level when the voltage Vcomp is increased to Vclp_L.

The n-channel MOSFET 103 in the Vcomp clamp circuit 100 in accordance with the present embodiment is in on state when the burst control signal S2 and the switching signal S1 are at the high level and the output of the hysteresis comparator 113 is at the high level. When the burst control signal S2 is at the high level (H), the burst control mode is active, and thus the switching power-supply apparatus 1 performs the burst operation. When the switching signal S1 is at the high level, the switching power-supply apparatus 1 disables the switching operation of the switching element 7. Accordingly, when the switching operation is disabled in the burst operation, the n-channel MOSFET 103 is in on state when the output of the hysteresis comparator 113 is at the high level and is in off state when the output of the hysteresis comparator 113 is at the low level. The n-channel MOSFET 103 includes a source grounded via the pull-out resistor 111 and a drain connected to the COMP terminal. Thus, the n-channel MOSFET 103 in the burst operation has a function equivalent to that of the MOSFET 25 of the decrease circuit 51 in the switching power-supply apparatus 1 depicted in FIG. 1.

Figure 8:
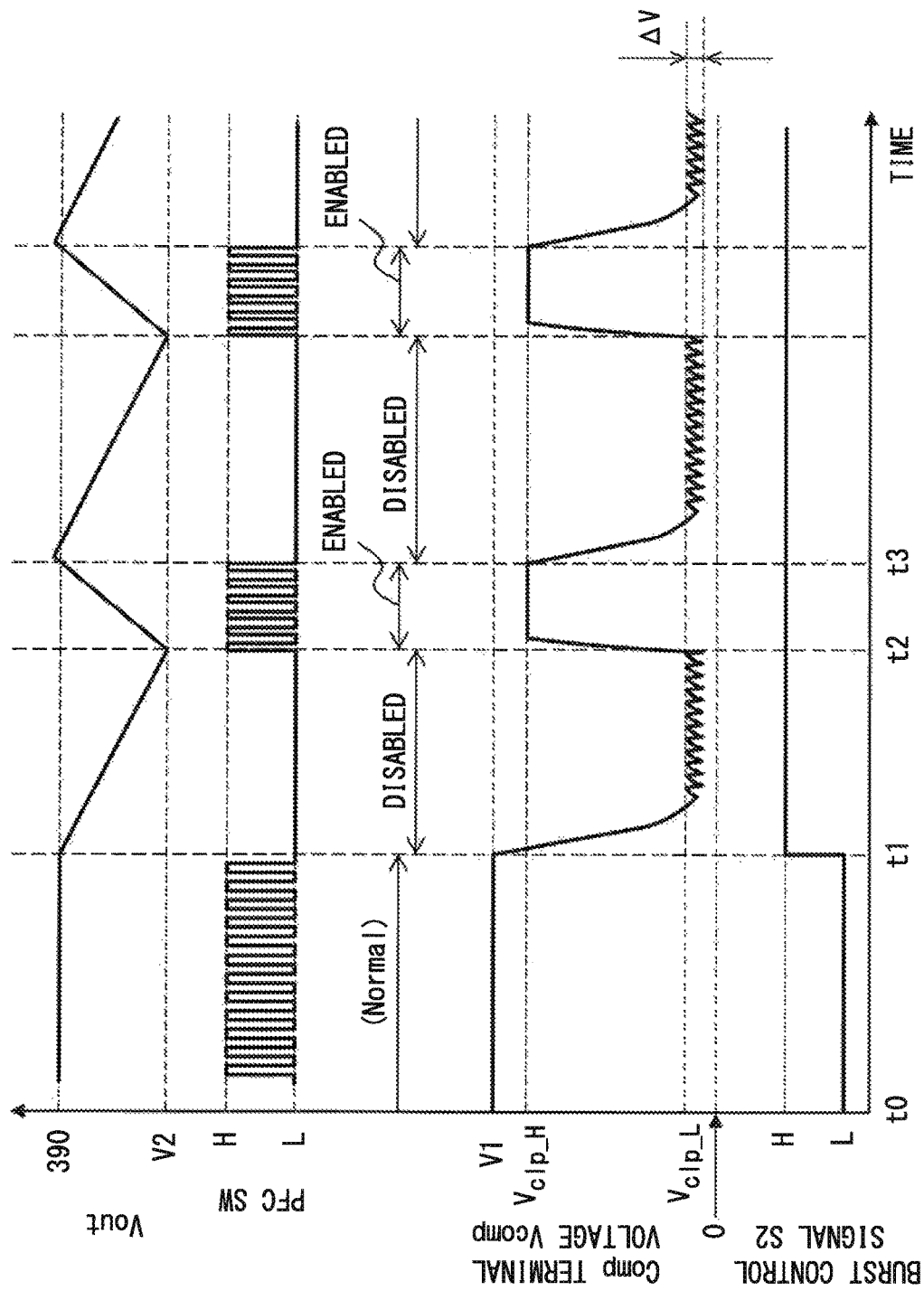
FIG. 8 is a waveform diagram illustrating a burst operation of a switching power-supply apparatus in accordance with a second embodiment.

Next, descriptions will be given of the operations of the switching power-supply apparatus 1 in accordance with the second embodiment that includes the Vcomp clamp circuit 100 depicted in FIG. 7 by referring to FIG. 8. FIG. 8 is a waveform diagram illustrating the burst operation of the switching power-supply apparatus in accordance with the second embodiment.

FIG. 8 depicts temporal changes in a DC voltage Vout output by the switching power-supply apparatus 1 in accordance with the present embodiment that includes the Vcomp clamp circuit 100 depicted in FIG. 7, a control signal PFC SW for controlling the ON/OFF of the switching element 7, a voltage Vcomp of the COMP terminal, and a burst control signal S2.

The burst control signal S2 in the waveform diagram in FIG. 8 is, as described above, a signal that includes information indicating the load state of the switching power-supply apparatus 1, i.e., a signal input to the control IC 10 from another circuit provided outside the control IC 10. The burst control signal S2 is at the high level (H) when the load state is light load or no load, and is otherwise at the low level (L). Accordingly, when the burst control signal S2 is a low-level signal, the control IC 10 is in an operating state in which the burst control mode is not active (i.e., a normal state in which the burst operation is not performed).

The waveform diagram depicted in FIG. 8 indicates that the burst control signal S2 is at the low level (L) during the period from time t0 to time t1. Hence, the ON/OFF control of the switching element 7 performed by the control IC 10 during the period from time t0 to time t1 does not involve the burst operation (so-called normal control is performed). In addition, the Vcomp clamp circuit 100 does not perform the clamp operation since the first p-channel MOSFET 101 and the n-channel MOSFET 103 of the Vcomp clamp circuit 100 are in off state. Thus, the signal PFC SW input to the switching element 7 is switched between High (H) and Low (L) in series, and the voltage Vcomp of the COMP terminal is maintained at a voltage V1 that corresponds to an input voltage Vout' and the load state. Accordingly, the DC voltage Vout output by the switching power-supply apparatus 1 is maintained at a predetermined value (390V with reference to FIG. 8).

In FIG. 8, Vout=390V corresponds to a reference voltage Vth2H input to the hysteresis comparator 24, and V2 corresponds to a reference voltage Vth2L. Since Vout reaches 390V in the normal operation, the output S1 of the hysteresis comparator 24, i.e., the switching signal S1 for switching between the disabled period and the enabled period for the switching operation, reaches the high level at time t1.

When, for example, a circuit provided outside the control IC 10 detects at time t1 that the load state is light load or no load, the burst control signal S2 input to the control IC 10 is switched from the low level (L) to the high level (H). Hence, the burst control mode is activated in the control IC 10. Meanwhile, as the burst control signal S2 input to the control IC 10 is switched to the high level (H) and the switching signal S1 is at the high level, the first p-channel MOSFET 101 of the Vcomp clamp circuit 100 remains in off state. At time t1, as Vcomp>Vclp_L is satisfied and the output of the hysteresis comparator 113 is at the high level, the outputs of the AND circuits 110 and 112 are at the high level. Accordingly, the n-channel MOSFET 103 in the Vcomp clamp circuit 100 is turned on to perform the operation of decreasing (pulling down) the voltage Vcomp of the COMP terminal.

When the burst control mode is activated to start the burst operation at time t1, the switching power-supply apparatus 1 will first be operated with the switching operation of the switching element 7 disabled as indicated in FIG. 8 since the switching signal S1 is at the high level. In the meantime, at time t1 and just thereafter, the signal output by the hysteresis comparator 113 and the outputs of the AND circuits 110 and 112 are high-level signals, as described above. Thus, at time t1 and thereafter, the n-channel MOSFET 103 of the Vcomp clamp circuit 100 is in on state, and the circuit for decreasing the voltage Vcomp of the COMP terminal is operated. When the voltage Vcomp is decreased to the lower-limit voltage Vclp_L-$\Delta$V and the output of the hysteresis comparator 113 is switched to the low level turning off the n-channel MOSFET 103, the voltage Vcomp of the COMP terminal rises owing to the original function of the error amplifier 22. When the voltage Vcomp reaches the lower-limit voltage Vclp_L, the output of the hysteresis comparator 113 is switched to the high level again, thereby causing the voltage Vcomp to start to decrease. After this, as depicted in FIG. 8, the voltage Vcomp repeatedly varies within the voltage range from Vclp_L to (Vclp_L-$\Delta$V) which depends on the hysteresis voltage width $\Delta$V. Accordingly, setting the hysteresis voltage $\Delta$V to a very low value relative to the reference voltage specific to the hysteresis comparator 113 allows the voltage Vcomp of the COMP terminal to be clamped at an essentially desired lower-limit voltage Vclp_L.

Subsequently, at time t2, at which the DC voltage Vout decreases to the predetermined potential V2, the output S1 of the hysteresis comparator 24, i.e., the switching signal S1 for switching between the disabled period and the enabled period for the switching operation, is switched to the low level, thereby switching the burst operation performed by the switching power-supply apparatus 1 from the operation of disabling the switching operation to the operation of enabling the switching operation. In particular, the switching power-supply apparatus 1 resumes the switching operation of the switching element 7 at time t2. In this case, the burst control signal S2 input to the AND circuit 110 and the OR circuit 120 of the Vcomp clamp circuit 100 remains as a high-level signal, while the switching signal S1 is switched to the low level (L) indicating the enabled period. Thus, the output signals of the AND circuit 110 and the OR circuit 120 are switched from the high level (H) to the low level (L), the p-channel MOSFET 101 is in on state, and the n-channel MOSFET 103 is in off state. Accordingly, at time t2 and thereafter, only the circuit for clamping the upper limit of the voltage Vcomp of the COMP terminal at the upper-limit voltage Vclp_H by means of the operational amplifier 108 is operated in the Vcomp clamp circuit 100.

After time t2, the switching power-supply apparatus 1 resumes the operation of the switching element 7, thereby raising the DC voltage Vout. Meanwhile, the circuit for decreasing the voltage Vcomp of the COMP terminal is stopped and the circuit for increasing this voltage is operated in the Vcomp clamp circuit 100, thereby raising the voltage Vcomp of the COMP terminal, but the voltage Vcomp is clamped at the upper-limit voltage Vclp_H due to virtual short-circuiting of the operational amplifier 108. Accordingly, as depicted in FIG. 8, the voltage Vcomp during the switching-operation enabled period is clamped at the upper-limit voltage Vclp_H lower than the voltage V1 provided during a non-burst operation.

At time t3, at which the DC voltage Vout returns to a predetermined potential (390V with reference to FIG. 8), the switching signal S1, i.e., the output S1 of the hysteresis comparator 24, is switched to the high level, thereby switching the burst operation performed by the switching power-supply apparatus 1 from the operation of enabling the switching operation back to the operation of disabling the switching operation. Then, the switching power-supply apparatus 1 repeatedly performs the operation of disabling the switching operation and the operation of enabling the switching operation until the burst control signal S2 reaches the low level (L).

The burst control signal S2 reaching the low level (L) switches the output signal S3 of the AND circuit 21 to the low level and thus releases the resetting of the flip-flop circuit 15, thereby resuming the switching. Meanwhile, the output of the AND circuit 110 is switched to the low level while the output of the OR circuit 120 is switched to the high level, thereby turning off both the p-channel MOSFET 101 and the n-channel MOSFET 103, with the result that the function of the Vcomp clamp circuit 100 is stopped. Accordingly, as in the period from time t0 to time t1, the voltage Vcomp of the COMP terminal rises, owing to the original function of the error amplifier 22, to the voltage V1 provided during the non-burst operation which is higher than the upper-limit voltage Vclp_H.

As described above, the switching power-supply apparatus 1 in accordance with the present embodiment limits the voltage Vcomp of the COMP terminal during the burst operation within the range from the upper-limit voltage Vclp_H to the lower-limit voltage Vclp_L. Hence, the voltage Vcomp of the COMP terminal at the switching from the disabled state to the enabled state for the switching operation in the switching power-supply apparatus 1 in accordance with the present embodiment can be set at a potential higher than that of the voltage Vcomp (GND potential) at the switching in the switching power-supply apparatus 1 depicted in FIG. 1. Thus, an ON width such that the voltage Vcomp of the COMP terminal can raise the DC voltage Vout can be achieved in a shorter time after the switching operation of the switching element 7 is started at time t2. In addition, the length of an ON time of the switching element that is determined by the voltage Vcomp of the COMP terminal is nonzero, i.e., a significant length, even just after the switching from the disabled period to the enabled period for the switching operation, so that undershoot of the DC voltage Vout just after switching can be reduced.

The switching power-supply apparatus 1 in accordance with the present embodiment is such that the voltage Vcomp at the timing (time t3) at which the enabled period is switched to the disabled period for the switching operation is clamped at the upper-limit voltage Vclp_H lower than the potential provided during the non-burst operation. Thus, the switching power-supply apparatus 1 in accordance with the present embodiment allows only low current to pass through the inductor 6 at the timing of switching from the enabled period to the disabled period for the switching operation, so that overshoot of the DC voltage Vout can be reduced.

Accordingly, the switching power-supply apparatus 1 in accordance with the present embodiment can prevent an occurrence of a period in which due to major undershoot or overshoot of the DC voltage Vout during the burst operation, the output voltage cannot be sent effectively to the load when the converter in the subsequent stage performs a switching operation. Thus, the switching power-supply apparatus 1 that includes the power factor improvement circuit in accordance with the present embodiment can reduce a period during the burst operation in which the DC voltage Vcomp cannot be output, thereby decreasing switching loss.

The Vcomp clamp circuit 100 of the switching power-supply apparatus 1 in accordance with the present embodiment is not limited to the configuration depicted in FIG. 7 and can be modified as appropriate. For example, the Vcomp clamp circuit 100 may be a circuit that can change the upper-limit voltage Vclp_H for the voltage Vcomp of the COMP terminal during the burst operation on the basis of a signal Vinh that includes information on an input voltage.

Figure 9:
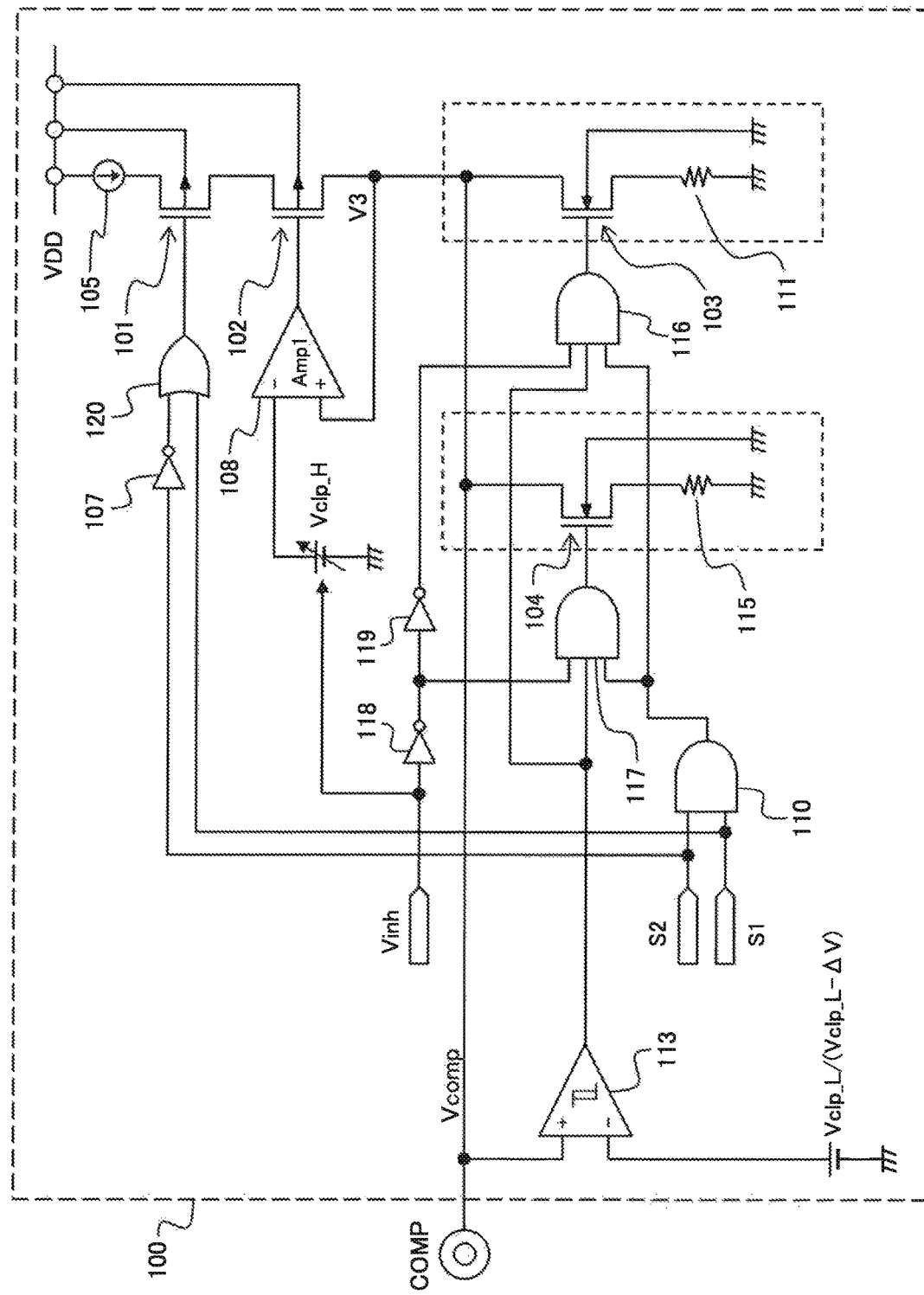
FIG. 9 illustrates another configuration of a Vcomp clamp circuit in accordance with a second embodiment.

FIG. 9 illustrates another configuration of the Vcomp clamp circuit in accordance with the second embodiment.

The Vcomp clamp circuit 100 depicted in FIG. 9 includes two p-channel MOSFETs 101 and 102, two n-channel MOSFETs 103 and 104, one current source 105, and two pull-out resistors 111 and 115. The Vcomp clamp circuit 100 also includes three NOT circuits 107, 118, and 119, an operational amplifier 108, three AND circuits 110, 116, and 117, an OR circuit 120, and a hysteresis comparator 113.

The two p-channel MOSFETs 101 and 102 are connected in series in such a manner as to connect the drain of the first p-channel MOSFET 101 and the source of the second p-channel MOSFET 102. The source of the first p-channel MOSFET 101 is connected to a power supply VDD via the first current source 105. The drain of the second p-channel MOSFET 102 is connected to a COMP terminal. In addition, the back gate of the first p-channel MOSFET 101 and the back gate of the second p-channel MOSFET 102 are each connected to the power supply VDD.

The drain of the first n-channel MOSFET 103 is connected to the COMP terminal. The source of the first n-channel MOSFET 103 is connected to one end of the pull-out resistor 111. The other end of the pull-out resistor 111 is grounded. In addition, the back gate of the first n-channel MOSFET 103 is grounded.

The drain of the second n-channel MOSFET 104 is connected to the COMP terminal. The source of the second n-channel MOSFET 104 is connected to one end of the pull-out resistor 115. The other end of the pull-out resistor 115 is grounded. In addition, the back gate of the second n-channel MOSFET 104 is grounded.

The output of the OR circuit 120 is input to the gate of the first p-channel MOSFET 101. The OR circuit 120 has input thereto a switching signal S1 and a signal obtained by the NOT circuit (inverter) 107 inverting the logical level of a burst control signal S2. As described above, the logical level of the burst control signal S2 is High (H) when the load state is light load or no load. Accordingly, when the load state is light load or no load and the switching signal S1 is at the low level, a low-level signal is applied to the gate of the first p-channel MOSFET 101.

An output signal of the operational amplifier (Amp1) 108 is input to the gate of the second p-channel MOSFET 102. The operational amplifier 108, the voltage source for supplying the upper-limit voltage Vclp_H, and the functions and components pertaining to the signal Vinh that includes information on an input voltage are similar to those indicated in FIG. 6, and detailed descriptions thereof are omitted herein.

The output signal of the AND circuit 116 is input to the gate of the first n-channel MOSFET 103. The AND circuit 116 outputs the logical product of the output signal of the AND circuit 110, the output signal of the hysteresis comparator 113, and the signal Vinh that includes information on an input voltage. As described above, the AND circuit 110 outputs the logical product of the burst control signal S2 and the switching signal S1 for switching between the disabled period and the enabled period for the switching operation. The hysteresis comparator 113 and the functions and components pertaining to the lower-limit voltage Vclp_L/(Vclp_L-ΔV) supplied by the voltage source are similar to those indicated in FIG. 7, and detailed descriptions thereof are omitted herein. The signal Vinh that includes information on an input voltage, i.e., a signal to be input to the AND circuit 116, is changed, as a result of inverting the logical level thereof twice by means of the first NOT circuit 118 and the second NOT circuit 119, back into a signal with a logical level as of the inputting of this signal to the Vcomp clamp circuit 100, and is then input to the AND circuit 116.

The output signal of the AND circuit 117 is input to the gate of the second n-channel MOSFET 104. The AND circuit 117 outputs the logical product of the output signal of the AND circuit 110, the output signal of the hysteresis comparator 113, and a signal that is an inversion of the signal Vinh that includes information on an input voltage. The output signal of the hysteresis comparator 113 and the output signal of the AND circuit 110 that are input to the AND circuit 117 are each at the same logical level as the output signal input to the AND circuit 116. Regarding the treatment of the signal Vinh that includes information on an input voltage, by contrast, a signal obtained by the first NOT circuit 118 inverting the logical level of the signal Vinh is input to the AND circuit 117, i.e., a signal with a logical level opposite to that of the signal input to the AND circuit 116 is input to the AND circuit 117. Thus, the output signals of the AND circuits 116 and 117 are not concurrently kept at the high level.

For example, the Vcomp clamp circuit 100 depicted in FIG. 9 may be such that a high-level signal or a low-level signal obtained by determining, as described above, whether the AC power supply 2 is a 100V power supply or a 200V power supply is input as the signal Vinh that includes information on an input voltage. When the signal Vinh is a low-level signal obtained by determining that the AC power supply 2 is a 100V power supply, a high-level signal will be input to the AND circuit 117, and a low-level signal will be input to the AND circuit 116. When the signal Vinh is a high-level signal obtained by determining that the AC power supply 2 is a 200V power supply, a low-level signal will be input to the AND circuit 117, and a high-level signal will be input to the AND circuit 116. Thus, the Vcomp clamp circuit 100 depicted in FIG. 9 may switch between circuits for decreasing the voltage Vcomp of the COMP terminal in accordance with whether the AC power supply 2 is a 100V power supply or a 200V power supply. Accordingly, setting the resistance values of the pull-out resistors 111 and 115 in accordance with the AC power supply allows the voltage Vcomp of the COMP terminal to be decreased at an optimum rate irrespective of whether the AC power supply 2 is a 100V power supply or a 200V power supply.

Note that the switching power-supply apparatus 1 depicted in FIG. 3 is merely an example of the switching power-supply apparatus that includes the power factor improvement circuit in accordance with each of the above-described embodiments. The switching power-supply apparatus 1 that includes the above-described power factor improvement circuit (control IC 10) is not limited to the configuration depicted in FIG. 3 and can be modified as appropriate. The control IC 10 depicted in FIG. 3 is merely an example of a semiconductor apparatus that includes the Vcomp clamp circuit 100 in accordance with each of the above-described embodiments. The control IC 10 is not limited to the configuration depicted in FIG. 3 and can be modified as appropriate.

In addition, the Vcomp clamp circuit 100 in accordance with each of the above-described embodiments is not limited to the configuration depicted in FIG. 4, 6, 7, or 9 and can be modified, as appropriate, without departing from the gist of what is described herein by referring to the embodiments.

What is claimed is:

1. A power factor improvement circuit that performs, on the basis of an output voltage when a switching power-supply apparatus is in a light-load state or a no-load state, a burst operation for switching between a stopped state in which a switching operation of a switching element is disabled and an operating state in which the switching operation of the switching element is enabled, the power factor improvement circuit comprising:
   a first circuit that outputs a first voltage that corresponds to an error between a reference voltage and a voltage obtained by dividing the output voltage;
   a second circuit that outputs a second voltage that starts to rise from a predetermined initial value in synchrony with the switching element being turned on;
   a third circuit that turns off the switching element when the second voltage has reached the first voltage; and
   a clamp circuit that, while the burst operation is performed, clamps a lower limit of the first voltage, which decreases when the switching operation of the switching element in the stopped state is disabled, at a lower-limit voltage higher than a ground voltage of the power factor improvement circuit and clamps an upper limit of the first voltage, which increases when the switching operation of the switching element in the operating state is performed, at an upper-limit voltage.

2. The power factor improvement circuit according to claim 1, wherein
   the clamp circuit includes
      a first amplifier that clamps the first voltage at the upper-limit voltage during the operating state in the burst operation, and
      a second amplifier that clamps the first voltage at the lower-limit voltage during the stopped state in the burst operation.

3. The power factor improvement circuit according to claim 2, wherein
   the clamp circuit further includes a voltage source that supplies the upper-limit voltage to be input to the first amplifier, and
   the voltage source is a variable voltage source capable of varying the upper-limit voltage in accordance with an input voltage of the switching power-supply apparatus.

4. The power factor improvement circuit according to claim 1, wherein
   the clamp circuit includes
      an amplifier that clamps the first voltage at the upper-limit voltage during the operating state in the burst operation, and
      a circuit that decreases the first voltage on the basis of a result of comparison between the first voltage and the lower-limit voltage during the stopped state in the burst operation.

5. The power factor improvement circuit according to claim 4, wherein
   the circuit that decreases the first voltage includes a hysteresis comparator that compares the first voltage with the lower-limit voltage, the lower-limit voltage comprising a first lower-limit voltage and a second lower-limit voltage, and
   the clamp circuit varies the first voltage between the first lower-limit voltage and the second lower-limit voltage during the stopped state in the burst operation.

6. The power factor improvement circuit according to claim 4, wherein
   the clamp circuit further includes a voltage source that supplies the upper-limit voltage to be input to the first amplifier, and
   the voltage source is a variable voltage source capable of varying the upper-limit voltage in accordance with an input voltage of the switching power-supply apparatus.

7. The power factor improvement circuit according to claim 6, wherein
   the clamp circuit further includes a first decrease circuit that decreases the first voltage when a division of the input voltage is equal to or less than a threshold and a second decrease circuit that decreases the first voltage when the voltage obtained by dividing the output voltage is greater than the threshold.

8. A semiconductor apparatus that controls, on the basis of an output voltage when a switching power-supply apparatus is in a light-load state or a no-load state, a burst operation for switching between a stopped state in which a switching operation of a switching element is disabled and an operating state in which the switching operation of the switching element is enabled, the semiconductor apparatus comprising:
   a first circuit that outputs a first voltage that corresponds to an error between a reference voltage and a voltage obtained by dividing the output voltage;
   a second circuit that outputs a second voltage that starts to rise from a predetermined initial value in synchrony with the switching element being turned on;
   a third circuit that outputs a signal for turning off the switching element when the second voltage has reached the first voltage; and
   a clamp circuit that, while the burst operation is performed, clamps a lower limit of the first voltage, which decreases when the switching operation of the switching element in the stopped state is disabled, at a lower-limit voltage higher than a ground voltage of a power factor improvement circuit including the semiconductor apparatus and clamps an upper limit of the first voltage, which increases when the switching operation of the switching element in the operating state is performed, at an upper-limit voltage.

* * * * *